United States Patent [19]

Okazaki et al.

[11] Patent Number: 5,747,121
[45] Date of Patent: *May 5, 1998

[54] OPTICAL COMPENSATORY SHEET

[75] Inventors: Masaki Okazaki; Shigeki Yokoyama; Masayuki Negoro, all of Kanagawa, Japan

[73] Assignee: Fuji Photo Film Co., Ltd., Minami-ashigara, Japan

[*] Notice: The term of this patent shall not extend beyond the expiration date of Pat. No. 5,583,679.

[21] Appl. No.: 598,278

[22] Filed: Feb. 8, 1996

[30] Foreign Application Priority Data

| Feb. 8, 1995 | [JP] | Japan | 7-020583 |
| Apr. 20, 1995 | [JP] | Japan | 7-094659 |
| Jul. 27, 1995 | [JP] | Japan | 7-210212 |

[51] Int. Cl.$^6$ .................................. C09K 19/00
[52] U.S. Cl. .................... 428/1; 359/73; 359/76; 428/522
[58] Field of Search ............ 428/1, 522; 359/73, 359/76

[56] References Cited

U.S. PATENT DOCUMENTS

| 4,820,026 | 4/1989 | Okada et al. | 428/1 |
| 5,583,679 | 12/1996 | Ito | 349/118 |
| 5,631,051 | 5/1997 | Ito | 428/1 |

FOREIGN PATENT DOCUMENTS

| 611786 | 8/1994 | European Pat. Off. |
| 611981 | 8/1994 | European Pat. Off. |
| 4417409 | 11/1994 | Germany. |
| 19519928 | 12/1995 | Germany. |

*Primary Examiner*—Nasser Ahmad
*Attorney, Agent, or Firm*—Burns, Doane, Swecker & Mathis, LLP

[57] ABSTRACT

An optical compensatory sheet is composed of a transparent support, an orientation layer and an optically anisotropic layer. The orientation layer is made of a polymer, and the optically anisotropic layer is made of a liquid crystalline compound. The polymer of the orientation layer is chemically bonded to the liquid crystalline compound of the optically anisotropic layer via the interface of these layers. An element composed of a transparent support and a polymer layer of a polyvinyl alcohol at least one hydroxyl group of which is substituted with a group having a vinyl moiety, an oxiranyl moiety or an aziridinyl moiety, is useful for the preparation of the optical compensatory sheet.

10 Claims, 3 Drawing Sheets

OPTICAL COMPENSATORY SHEET

BACKGROUND OF THE INVENTION

1. Field of the Invention

The present invention relates to an element which can be utilized for the preparation of optical elements such as an optical compensatory sheet and a liquid crystal cell, and further relates to the optical compensatory sheet.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its small thickness, light weight and low power consumption. LCD generally has a structure that a liquid crystal cell is disposed between a pair of polarizing sheets.

The liquid crystal cell comprises a pair of substrates provided with transparent electrode and a liquid crystalline compound sealed therebetween. The substrate generally has an orientation layer prepared by rubbing a layer of polymer such as polyimide, polyvinyl alcohol or gelatin, or an orientation layer formed by obliquely depositing an inorganic compound. The orientation layer has a function of defining an orientation direction of the liquid crystalline compound. The orientation layer preferably is a rubbed polymer layer from the viewpoint of productivity. As polymer suitable for the orientation layer, therefore, polymers capable of easily and stably tilting the liquid crystalline compound by rubbing are greatly desired.

Most of LCD having the above structure use a twisted nematic liquid crystal. Operational mode of LCD using the twisted nematic liquid crystal is roughly divided into two types, i.e., a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large area by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-and-white display of high contrast. Hence, the optical rotatory mode has a number of advantages compared with the birefringence mode or other modes. However, TN-LCD has disadvantages that color or contrast on display varies depending upon viewing angle to the liquid crystal display, and its display characteristics are not comparable to display characteristics of CRT.

In order to improve the viewing angle characteristics (i.e., to enlarge the viewable angle), arrangement of a phase difference film (optical compensatory sheet) between a pair of polarizing plates and TN liquid crystal cell has been proposed.

The optical compensatory sheets show no optical effect when a liquid crystal display is seen from the direction vertical to the screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from an oblique direction. The phase difference results in unfavorable viewing angle characteristics such as coloring and disappearance of displayed image.

It is known that the optical compensatory sheet is needed to have negative birefringence for compensating positive birefringence of the twisted nematic liquid crystal and an inclined optic axis.

EP 0576304-A1 discloses an optical compensatory sheet having the negative birefringence and inclined optic axis. In more detail, the disclosed sheet is prepared by stretching a polymer such as polycarbonate or polyester and has the directions of the main refractive indices which are inclined from the normal of the sheet. To prepare the above sheet by the stretching treatment, extremely complicated treatments are required. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of polymer showing liquid crystal property on an orientation layer provided on a support film. As a polymer for the orientation layer, polyimide is employed. Further, polyamide such as nylon (No. 3(1991)-9326) and polyvinyl alcohol (No. 3(1991)-291601) are also described as other polymer examples. The polymers showing liquid crystal property described in these Publications are not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound showing liquid crystal property and positive birefringence. The birefringence plate is prepared by coating a solution of the lod-like compound on the support and curing the compound with orienting the compound by the application of the magnetic or electric field. Further, the Publication describes use of rubbed polyimide, silane coupling agent having a long chain alkyl group and deposited layer of silicon oxide, to orient the compound, although the layers are not employed in Example. The cured layer of the Publication, however, dose not show negative birefringence. Hence, the resulting compensatory sheet scarcely enlarges the viewing angle from all directions.

SUMMARY OF THE INVENTION

As described above, various polymers for the orientation layer are known. However, these polymers do not give the orientation layer which is capable of easily and stably tilting the liquid crystalline compound. Therefore, the known optical compensatory sheet comprising a support film, an orientation layer and a liquid crystalline compound layer cannot greatly enlarge the viewing angle from all directions.

The copending application discloses an optical compensatory sheet greatly enlarging the viewing angle from all directions (see U.S. application No. 08/310,101; or E.P. Application No. 94114956.9 (EP 646829 A1, Date of publication: Apr. 5, 1995)).

The optical compensatory sheet has a representative structure comprising a transparent support, an orientation layer such as a rubbed polyvinyl alcohol layer thereon, and an optically anisotropic layer of discotic liquid crystalline compound provided on the orientation layer. In the sheet, use of the discotic liquid crystalline compound brings about enlargement of the viewing angle. However, the orientation layer is not satisfactorily capable of easily and stably tilting the discotic liquid crystalline compound. Further, in the case that the optical compensatory sheet is stored or employed for a long time, it is occasionally found that the optically anisotropic layer is exfoliated from the orientation layer.

It is an object of the present invention to provide an element provided with a polymer layer which is capable of easily orienting a liquid crystalline compound by subjecting its surface to orientation treatment, especially capable of orienting a discotic liquid crystalline compound.

It is another object of the invention to provide an optical compensatory sheet having an orientation layer which is capable of easily orienting a discotic liquid crystalline compound.

It is a further object of the invention to provide an optical compensatory sheet which has an excellent durability, gives an enlarged viewing angle, and can be easily prepared.

There is provided by the invention an optical compensatory sheet which comprises a transparent support, an orientation layer provided thereon and an optically anisotropic layer provided on the orientation layer, the orientation layer comprising a polymer and the optically anisotropic layer comprising a liquid crystalline compound, wherein the polymer of orientation layer is chemically bonded to the liquid crystalline compound of optically anisotropic layer via the interface of these layers.

Preferred optical compensatory sheets according to the invention are as follows:

1) The optical compensatory sheet wherein the polymer layer is formed of polyvinyl alcohol at least one hydroxyl group of which is substituted with a group having a vinyl moiety, an oxiranyl moiety or an aziridinyl moiety.

2) The optical compensatory sheet wherein the optically anisotropic layer is formed of a liquid crystalline compound which has a group having a vinyl moiety, an oxiranyl moiety or an aziridinyl moiety.

3) The optical compensatory sheet wherein the liquid crystalline compound is a discotic liquid crystalline compound which has a group having a vinyl moiety, an oxiranyl moiety or an aziridinyl moiety.

There is also provided by the invention an element having the structure of the above optical compensatory sheet.

The optical compensatory sheet or element is advantageously obtained by the use of the following element:

An element which comprises a transparent support and an polymer layer provided thereon comprising polyvinyl alcohol at least one hydroxyl group of which is substituted with a group having a vinyl moiety, an oxiranyl moiety or an aziridinyl moiety (each of the moieties containing its lower alkyl substitution compound).

Preferred elements according to the invention are as follows:

1) The element as defined in claim 5, wherein the vinyl moiety, the oxiranyl moiety or the aziridinyl moiety is connected to the polymer chain of the polyvinyl alcohol via an ether bonding, a urethane bonding, an acetal bonding or an ester bonding.

2) The element wherein the polyvinyl alcohol is represented by the formula (I):

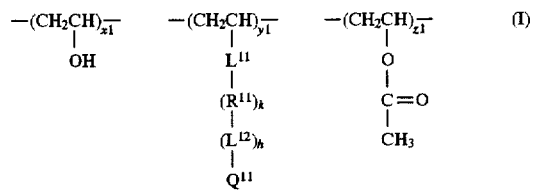

wherein $L^{11}$ represents an ether bonding, a urethane bonding, an acetal bonding or an ester bonding;

$R^{11}$ represents an alkylene group or an alkyleneoxy group;

$L^{12}$ represents a connecting group for linking $R^{11}$ with $Q^{11}$;

$Q^{11}$ represents vinyl, oxiranyl or aziridinyl;

x1 is in the range of 10 to 99.9 molar %, y1 is in the range of 0.01 to 80 molar % and z1 is in the range of 0 to 70 molar %, under the condition of x1+y1+z1=100; and each of k and h independently represents 0 or 1.

3) The element of 2) above wherein in the formula (I), $R^{11}$ represents —$R^2$— or —$R^3$—(O—CH$_2$CH$_2$)$_t$— in which each of $R^2$ and $R^3$ independently represents alkylene of 1 to 12 carbon atoms and t is an integer of 0 to 2, and especially $R^{11}$ represents alkylene of 1 to 12 carbon atoms; and $L^{12}$ represents —O—, —S—, —CO—, —O—CO—, —CO—O—, —O—CO—O—, —CO—O—CO—, —NRCO—, —CONR—, —NR—, —NRCONR—, —NRCO—O—, or —OCONR— in which R represents hydrogen or lower alkyl.

4) The element wherein the polyvinyl alcohol is represented by the formula (III):

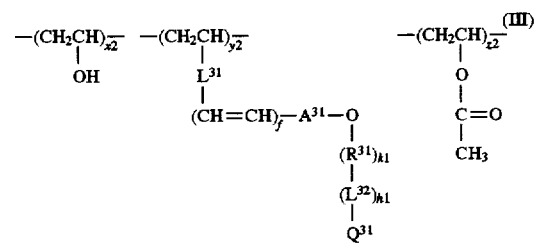

wherein $L^{31}$ represents an ether bonding, a urethane bonding, an acetal bonding or an ester bonding;

$A^{31}$ represents an arylene group of 6 to 24 carbon atoms or an arylene group of 6 to 24 carbon atoms which is substituted with halogen, alkyl of 1 to 4 carbon atoms or alkoxy of 1 to 4 carbon atoms;

$R^{31}$ represents —$R^2$— or —$R^3$—(O—CH$_2$CH$_2$)$_t$— in which each of $R^2$ and $R^3$ independently represents alkylene of 1 to 12 carbon atoms and t is an integer of 0 to 2;

$L^{32}$ represents —O—, —S—, —CO—, —O—CO—, —CO—O—, —O—CO—O—, —CO—O—CO—, —NRCO—, —CONR—, —NR—, —NRCONR—, —NRCO—O— or —OCONR— in which R represents hydrogen or lower alkyl;

$Q^{31}$ represents vinyl, oxiranyl or aziridinyl;

x2 is in the range of 10 to 99.9 molar %, y2 is in the range of 0.01 to 80 molar % and z2 is in the range of 0 to 70 molar %, under the condition of x2+y2+z2=100; and each of k1 and h1 independently represents 0 or 1.

5) The element wherein the group has no aromatic ring.

6) The element wherein the polyvinyl alcohol has a recurring unit having the group in an amount of 0.1 to 10 molar % based on a total amount of recurring units of the polyvinyl alcohol.

Further, there is provided by the invention an optical compensatory sheet which comprises a transparent support, an orientation layer provided thereon and an optically anisotropic layer provided on the orientation layer, the orientation layer comprising a polymer and the optically anisotropic layer comprising a liquid crystalline compound, wherein the polymer of orientation layer comprises polyvinyl alcohol at least one hydroxyl group of which is substituted with a group having the formula (II) described later.

Preferred optical compensatory sheets according to the invention are as follows:

1) The optical compensatory sheet wherein the optically anisotropic layer is formed of a discotic liquid crystalline compound.

2) The optical compensatory sheet wherein the liquid crystalline compound is a discotic liquid crystalline compound which has a group having an aryl moiety.

There is also provided by the invention an element having the structure of the above optical compensatory sheet.

The optical compensatory sheet or element is advantageously obtained by the use of the following element:

An element which comprises a transparent support and an polymer layer provided thereon comprising a polyvinyl alcohol at least one hydroxyl group of which is substituted with a group having the formula (II):

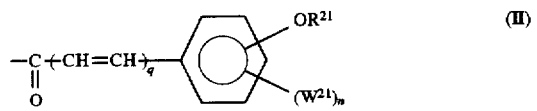

wherein $R^{21}$ represents an alkyl group or an alkyl group which is substituted with alkyl, alkoxy, aryl, halogen, vinyl, vinyloxy, oxiranyl, acryloyloxy, methacryloyloxy or crotonoyloxy;

$w^{21}$ represents an alkyl group, an alkyl group which is substituted with alkyl, alkoxy, aryl, halogen, vinyl, vinyloxy, oxiranyl, acryloyloxy, methacryloyloxy or crotonoyloxy, an alkoxy group, an alkoxy group which is substituted with alkyl, alkoxy, aryl, halogen, vinyl, vinyloxy, oxiranyl, acryloyloxy, methacryloyloxy or crotonoyloxy;

q is 0 or 1; and n is an integer of 0 to 4.

Preferred elements according to the invention are as follows:

1) The element wherein $R^{21}$ represents an alkyl group or an alkyl group which is substituted with alkyl, alkoxy, aryl or halogen; and $w^{21}$ represents an alkyl group, an alkyl group which is substituted with alkyl, alkoxy, aryl or halogen, an alkoxy group, an alkoxy group which is substituted with alkyl, alkoxy, aryl or halogen.

2) The element wherein $R^{21}$ represents an alkyl group which is substituted with vinyl, vinyloxy, oxiranyl, acryloyloxy, methacryloyloxy or crotonoyloxy; and $W^{21}$ represents an alkyl group, an alkyl group which is substituted with alkyl, alkoxy, aryl, halogen, vinyl, vinyloxy, oxiranyl, acryloyloxy, methacryloyloxy or crotonoyloxy, an alkoxy group, an alkoxy group which is substituted with alkyl, alkoxy, aryl, halogen, vinyl, vinyloxy, oxiranyl, acryloyloxy, methacryloyloxy or crotonoyloxy.

3) The element wherein the polyvinyl alcohol has a recurring unit having the aryl moiety in an amount of 0.1 to 10 molar % based on a total amount of recurring units of the polyvinyl alcohol.

The element of the invention comprising a transparent support and the specific polymer layer thereon is capable of easily orienting an liquid crystalline compound by subjecting the surface of the polymer layer to orientation treatment, especially capable of orienting a discotic liquid crystalline compound. Hence, the element is useful for not only the optical compensatory sheet but also a transparent substrate of a liquid crystal cell.

In the optical compensatory sheet of the invention, the polymer of orientation layer is chemically bonded to the liquid crystalline compound of optically anisotropic layer via the interface of these layers. Therefore the optical compensatory sheet shows high bonding strength between the orientation layer and the optically anisotropic layer, and the sheet exhibits an excellent durability as well as an enlarged viewing angle.

The sheet is prepared by forming a layer of discotic liquid crystalline compound having a polymerizable group on the orientation layer comprising the specific polymer having a polymerizable group such as vinyl and curing these layer by the application of UV light or heat. Therefore, the element of the invention can be advantageously employed for preparing the sheet.

DETAILED DESCRIPTION OF THE INVENTION

The element of the invention comprises a transparent support and a polymer layer comprising the specific polymer thereon.

Figure 1:
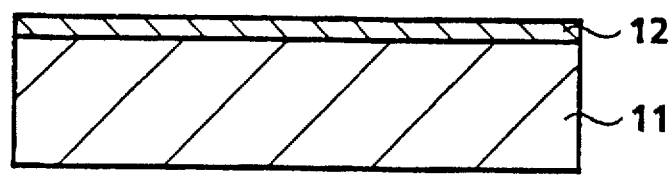
FIG. 1 is a view schematically showing the representative structure of the element of the invention.

The representative structure of the element is shown in FIG. 1. In FIG. 1, a transparent support 11 and a polymer layer 12 are superposed to constitute the element.

The polymer layer 12 is capable of easily orienting a liquid crystalline compound by subjecting the surface of the polymer layer to orientation treatment such as rubbing treatment. The polymer is a specific polymer having a polymerizable group such as a vinyl moiety, an oxiranyl moiety or an aziridinyl moiety or having an aryl group. The preferred polymer is the specific polyvinyl alcohol of the formula (I), (II) or (III).

The optical compensatory sheet of the invention has a basic structure comprising a transparent support, an orientation layer provided thereon and an optically anisotropic layer provided on the orientation layer.

Figure 2:
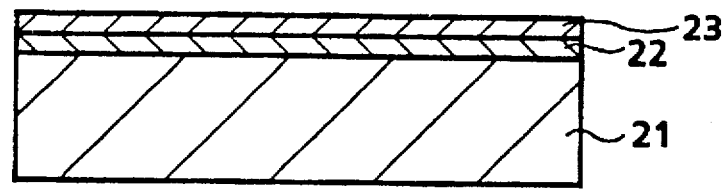
FIG. 2 is a view schematically showing the representative structure of the optical compensatory sheet of the invention.

The representative structure of the optical compensatory sheet of the invention is shown in FIG. 2. In FIG. 2, a transparent support 21, an orientation layer 22 and optically anisotropic layer (a layer of discotic liquid crystaline compound) 23 are superposed to constitute the optical compensatory sheet. The orientation layer 22 is the polymer layer of FIG. 1 which has been subjected to orientation treatment.

The optical compensatory sheet of the invention is characterized in that the polymer of the orientation layer 22 is chemically bonded to the liquid crystalline compound of the optically anisotropic layer 23 via the interface of these layers. Such chemical bonding between the two layers can be formed by reacting the polymerizable group of the polymer with a polymerizable group of the liquid crystalline compound. In this case, the optically anisotropic layer preferably comprises a discotic liquid crystalline compound having negative birefringence. Otherwise, the polymer layer may comprise polyvinyl alcohol which has no polymerizable group but has aryl group capable of easily orienting a discotic liquid crystalline compound.

As material of the transparent support of the invention, any material can be employed, so long as it is transparent. The material preferably is a film having a transmittance of not less than 80% and especially showing optical isotropy when it is viewed from a front side. Further, the film preferably has a negative uniaxial property and an optic axis in the normal line direction.

Therefore, the film is preferably prepared from material having a small intrinsic birefringence, such as triacetyl cellulose. Such material is available on market by the tradename of Geonex (from Nippon Geon Co., Ltd.), Arton (from Japan Synthetic Rubber Co., Ltd.) and Fuji TAC (from Fuji Photo Film Co., Ltd.). Moreover, materials having a large intrinsic birefringence such as polycarbonate, polyarylate, polysulfone and polyethersulfone are also employable by rendering the materials optically isotropic by appropriately controlling molecular orientation in the procedure of forming the film.

The transparent film generally satisfies the condition of:

$$nz < nx = ny$$

and preferably satisfies the condition of:

$$20 \leq \{(nx+ny)/2-nz\} \times d \leq 400 (nm)$$

in which nx and ny is main refractictive indices within the film and nz is a main refractive index in a thickness direction of the film and d is the depth (i.e., thickness) of the film, and more preferably satisfies the condition of:

$$30 \leq [(nx+ny)/2-nz] \times d < 150$$

In practical, it is not required that nx is exactly equal to ny, and it is satisfactory condition that nx is almost equal to ny. Therefore, the transparent film preferably satisfies the condition of:

$$|nx-ny|/|nx-nz| \leq 0.2$$

in which nx and ny have the same meanings as above.

Further, "$|nx-ny| \times d$" of retardation from front side (when the display is viewed from the front side) preferably is not more than 50 nm, especially not more than 20 nm.

A subbing layer is preferably formed on the transparent support to increase bonding strength between the transparent support and the orientation layer.

The orientation layer is provided on the transparent support. The orientation layer has a function of defining an orientation direction of a liquid crystalline compound such as a discotic liquid crystalline compound to be provided thereon by a coating method, and the orientation gives an optic axis inclined from an optical compensatory sheet.

In the invention, the orientation layer is a polymer layer which has been subjected to orientation treatment such as rubbing treatment, and the polymer comprises a polymer which has a group having vinyl, oxiranyl, aziridinyl or aryl.

The polymer preferably is polyvinyl alcohol. The orientation layer is explained with reference to polyvinyl alcohol below.

In the polyvinyl alcohol of the invention, its at least one hydroxyl group is substituted with a group having a vinyl moiety, an oxiranyl moiety or an aziridinyl moiety. The moiety is generally connected to the polymer chain (carbon atom) of the polyvinyl alcohol through an ether bonding (—O—), a urethane bonding (—OCONH—), an acetal bonding ((—O—)$_2$CH—) or an ester bonding (—OCO—) (linkage group). Preferred are a urethane bonding, an acetal bonding and an ester bonding. It is preferred that the vinyl, oxiranyl, aziridinyl or aryl is indirectly bonded to the polyvinyl alcohol through the bonding, i.e., the group is preferably bonded to the polyvinyl alcohol together with the linkage group as shown below.

The polyvinyl alcohol is generally represented by the formula (I), (II) or (III) described below:

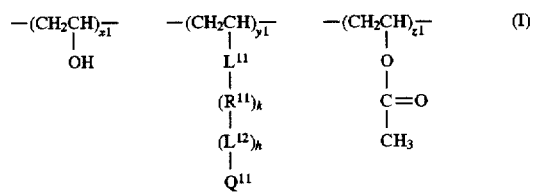

wherein $L^{11}$ represents an ether bonding, a urethane bonding, an acetal bonding, or an ester bonding;

$R^{11}$ represents an alkylene group or an alkyleneoxy group;

$L^{12}$ represents a group for connecting $R^{11}$ with $Q^{11}$;

$Q^{11}$ represents vinyl, oxiranyl or aziridinyl;

x1 is in the range of 10 to 99.9 molar %, y1 is in the range of 0.01 to 80 molar % and z1 is in the range of 0 to 70 molar %, under the condition of x1+y1+z1=100; and each of k and h independently represents 0 or 1.

In the formula (I), $R^{11}$ generally represents an alkylene group of 1 to 24 carbon atoms, an alkylene group of 3 to 24 carbon atoms in which one or more nonadjacent $CH_2$ groups are replaced by —O—, —CO—, —NH—, —NR$^7$— (in which R$^7$ represents alkyl of 1 to 4 carbon atoms or aryl of 6 to 15 carbon atoms), —S—, —SO$_2$— or arylene of 6 to 15 carbon atoms, or one or the other of the alkylene groups which are substituted with alkyl, aryl, alkoxy, aryloxy, alkylthio, arylthio, halogen, alkylcarbonyl, arylcarbonyl, alkylsulfonyl, arylsulfonyl, hydroxyl, mercapto, amino, alkylcarbonyloxy, arylcarbonyloxy, alkylsulfonyloxy, arylsulfonyloxy, alkylcarbonylthio, arylcarbonylthio, alkylsulfonylthio, arylsulfonylthio, alkylcarbonylamino, arylcarbonylamino, alkylsulfonylamino, arylsulfonylamino, carboxyl or sulfo.

$R^{11}$ preferably represents —R$^2$—, —R$^3$—(O—R$^4$)$_t$—O—R$^5$—, —R$^3$—CO—R$^6$—, —R$^3$—NH—R$^6$—, —R$^3$—NR$^7$—R$^6$—, —R$^3$—S—R$^6$—, —R$^3$—SO$_2$—R$^6$— or —R$^3$—A$^2$—R$^6$— in which each of R$^2$, R$^3$, R$^4$, R$^5$ and R$^6$ independently represents alkylene of 1 to 24 carbon atoms, R$^7$ represents alkyl of 1 to 12 carbon atoms or aryl of 6 to 15 carbon atoms, A$^2$ represents arylene of 6 to 24 carbon atoms and t is an integer of 0 to 4. $R^{11}$ more preferably represents —R$^2$— or —R$^3$—(O—CH$_2$CH$_2$)$_t$— in which each of R$^2$ and R$^3$ independently represents alkylene of 1 to 12 carbon atoms and t is an integer of 0 to 2, and especially $R^{11}$ represents alkylene of 1 to 12 carbon atoms.

The alkylene may have a substituent. Examples of the substituents include alkyl of 1 to 24 carbon atoms, aryl of 6 to 24 carbon atoms, alkoxy of 1 to 24 carbon atoms, aryloxy of 6 to 24 carbon atoms, alkylthio of 1 to 24 carbon atoms, arylthio of 6 to 24 carbon atoms, halogen (F, Cl, Br), alkylcarbonyl of 2 to 24 carbon atoms, arylcarbonyl of 7 to 24 carbon atoms, alkylsulfonyl of 1 to 24 carbon atoms, arylsulfonyl of 6 to 24 carbon atoms, hydroxyl, mercapto, amino, alkylcarbonyloxy of 2 to 24 carbon atoms, arylcarbonyloxy of 7 to 24 carbon atoms, alkylsulfonyloxy of 1 to 24 carbon atoms, arylsulfonyloxy of 6 to 24 carbon atoms, alkylcarbonylthio of 2 to 24 carbon atoms, arylcarbonylthio of 7 to 24 carbon atoms, alkylsufonylthio of 1 to 24 carbon atoms, arylsulfonylthio of 6 to 24 carbon atoms, alkylcarbonylamino of 7 to 24 carbon atoms, alkylsulfonylamino of 1 to 24 carbon atoms, arylsulfonylamino of 6 to 24 carbon atoms, carboxyl or sulfo.

The preferred examples of the substituents include alkyl of 1 to 24 carbon atoms (preferably 1 to 12 carbon atoms), aryl of 6 to 24 carbon atoms (preferably 6 to 14 carbon atoms) and alkoxyalkyl of 2 to 24 carbon atoms (preferably 2 to 12 carbon atoms). Examples of the alkyl include methyl, ethyl, n-pentyl, n-hexyl, n-heptyl, n-octyl, n-nonyl, n-decyl, n-undecyl, n-dodecyl, isopropyl, isobutyl, sec-butyl, t-amyl and 2-ethylhexyl. Examples of the alkyl substituted with 1 to 4 alkoxy groups include 2-methoxyethyl, 2-(2-methoxyethoxy)ethyl, 2-[2-(2-methoxyethoxy)ethoxy]ethyl, 2-n-butoxyethyl, 2-ethoxyethyl, 2-(2-ethoxyethoxy)ethyl, 3-methoxypropyl, 3-ethoxypropyl, 3-n-propyloxypropyl, 3-benzyloxypropyl and 2-methylbutyloxymethyl. Examples of the aryl include phenyl, 2-tolyl, 3-tolyl, 4-tolyl, 2-anisyl, 3-anisyl, 4-anisyl, 2-biphenyl, 3-biphenyl, 4-biphenyl, 2-chlorophenyl, 3-chlorophenyl, 4-chlorophenyl, 1-naphthyl and 2-naphthyl. Examples of heterocyclic group include pyridyl, pyrimidyl, thiazolyl and oxazolyl.

$L^{12}$ preferably represents —O—, —S—, —CO—, —O—CO—, —CO—O—, —O—CO—O—, —CO—O—CO—, —NRCO—, —CONR—, —NR—, —NRCONR—, —NRCO—O— or —OCONR— in which R represents hydrogen or lower alkyl. Preferred examples of -$(L^{12})_h$-$Q^{11}$ (h is 0 or 1) include vinyl, vinyloxy, acryloyl, methacryloyl, crotonoyl, acryloyloxy, methacryloyloxy, crotonoyloxy, vinylphenoxy, vinylbenzoyloxy, styryl, 1,2-epoxyethyl, 1,2-epoxypropyl, 2,3-epoxypropyl, 1,2-iminoethyl or 2,3-iminopropyl. Preferred are vinyl, vinyloxy, acryloyloxy, methacryloyloxy, crotonoyloxy, vinylbenzoyloxy, 1,2-epoxyethyl, 1,2-epoxypropyl, 2,3-epoxypropyl, 1,2-iminoethyl, 1,2-iminopropyl or 2,3-iminopropyl.

Each of x1, y1 and z1 represents a molar ratio (%) under the condition of x1+y1+z1=100. x1 generally is 10 to 99.9 molar %, y1 generally is 0.01 to 80 molar and z1 generally is 0 to 70 molar %. x1 preferably is 50 to 99.9 molar %, y1 preferably is 0.01 to 50 molar % (especially 0.01 to 10 molar %), and z1 preferably is 0 to 50 molar %.

In the case of $L^{11}$ is an acetal bonding, the polyvinyl alcohol of the formula (I) can be represented by the following formula (Ia):

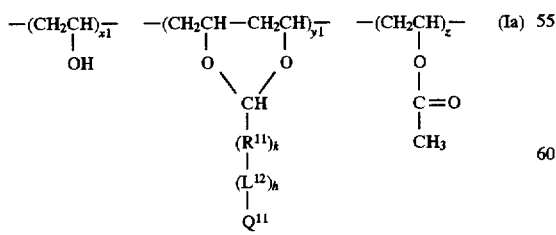

In the formula (Ia), Rphu 11, $Q^{11}$, x1, y1, z1, k and h have the same meanings as in the formula (I).

The polyvinyl alcohol of the invention can be also represented by the formula (III):

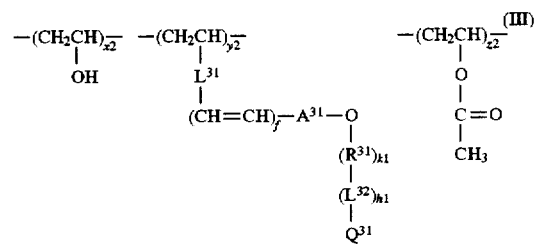

wherein $L^{31}$ represents an ether bonding, a urethane bonding, an acetal bonding, or an ester bonding;

$A^{31}$ represents an arylene group or an arylene group which is substituted with a halogen atom, an alkyl group, an alkoxy group or an alkoxy group which is substituted with alkoxy, aryl, halogen, vinyl, vinyloxy, acryloyl, methacryloyl, acryloyloxy, methacryloyloxy, crotonoyloxy, vinylphenoxy, vinylbenzoyloxy, styryl, 1,2-epoxyethyl, 1,2-epoxypropyl, 2,3-epoxypropyl, 1,2-iminoethyl or 2,3-iminopropyl (especially $A^{31}$ represents an arylene group of 6 to 24 carbon atoms or an arylene group of 6 to 24 carbon atoms which is substituted with halogen, alkyl of 1 to 4 carbon atoms or alkoxy of 1 to 4 carbon atoms);

$R^{31}$ represents the same group as in $R^{11}$;

$L^{32}$ represents the same group as in $L^{12}$;

$Q^{31}$ represents the same group as in $Q^{11}$;

x2 is in the range of 10 to 99.9 molar %, y2 is in the range of 0.01 to 80 molar %, and z2 is in the range of 0 to 70 molar %, under the condition of x2+y2+z2=100; and Each of k1 and h1 independently represents 0 or 1.

In the groups for $A^{31}$ described above, the arylene group generally has 6 to 24 carbon atoms, and preferably 6 to 12 carbon atoms. Examples of the arylene group include 1,4-phenylene, 1,3-phenylene, 1,2-phenylene and 1,5-naphthylene, and especially 1,4-phenylene. Examples of substituents of the arylene group include a halogen atom (F, Cl, Br or I), an alkyl group of 1 to 4 carbon atoms, an alkoxy group of 1 to 4 carbon atoms, or an alkoxy group of 1 to 4 carbon atoms which is substituted with alkoxy of 1 to 4 carbon atoms, aryl of 6 to 15 carbon atoms, halogen, vinyl, vinyloxy, oxiranyl, aziridinyl, acryloyl, methacryloyl, acryloyloxy, methacryloyloxy, crotonoyloxy, vinylbenzoyloxy and styryl. Preferred are a halogen atom, an alkyl group of 1 to 4 carbon atoms, an alkoxy group of 1 to 4 carbon atoms, and especially F, Cl and methyl are preferred.

x2 preferably is 50 to 99.9 molar %, y2 preferably is 0.01 to 50 molar % (especially 0.01 to 10 molar %), and z2 preferably is 0 to 50 molar %.

In the case that $L^{31}$ is an acetal bonding, the polyvinyl alcohol of the formula (III) can be represented by the following formula (IIIa):

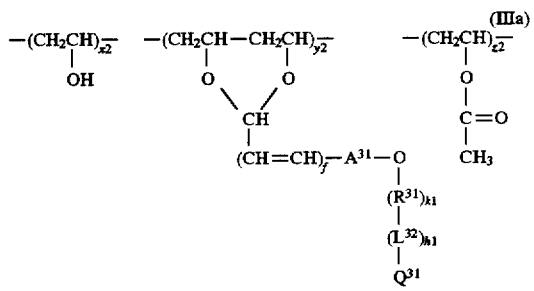

In the formula (IIIa), $A^{31}$, $R^{31}$, $Q^{31}$, x2, y2, z2, k1 and h1 have the same meanings as in the formula (III).

Further, the polyvinyl alcohol of the invention preferably is polyvinyl alcohol at least one hydroxyl group of which is substituted with a group having the formula (II):

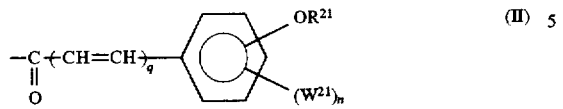

wherein $R^{21}$ represents an alkyl group or an alkyl group which is substituted with alkyl, alkoxy, aryl, halogen, vinyl, vinyloxy, oxiranyl, acryloyloxy, methacryloyloxy or crotonoyloxy;

$W^{21}$ represents an alkyl group, an alkyl group which is substituted with alkyl, alkoxy, aryl, halogen, vinyl, vinyloxy, oxiranyl, acryloyloxy, methacryloyloxy or crotonoyloxy, an alkoxy group, an alkoxy group which is substituted with alkyl, alkoxy, aryl, halogen, vinyl, vinyloxy, oxiranyl, acryloyloxy, methacryloyloxy or crotonoyloxy;

q is 0 or 1; and n is an integer of 0 to 4 (preferably 0 or 1, especially 0).

It is preferred that $R^{21}$ represents an alkyl group which may be substituted with alkyl, alkoxy, aryl or halogen; and $W^{21}$ represents an alkyl group which may be substituted with alkyl, alkoxy, aryl or halogen, an alkoxy group, an alkoxy group which is substituted with alkyl, alkoxy, aryl or halogen.

Also, it is preferred that $R^{21}$ represents an alkyl group which is substituted with vinyl, vinyloxy, oxiranyl, acryloyloxy, methacryloyloxy or crotonoyloxy; and $W^{21}$ represents an alkyl group, an alkyl group which is substituted with alkyl, alkoxy, aryl, halogen, vinyl, vinyloxy, oxiranyl, acryloyloxy, methacryloyloxy or crotonoyloxy, an alkoxy group which may be substituted with alkyl, alkoxy, aryl, halogen, vinyl, vinyloxy, oxiranyl, acryloyloxy, methacryloyloxy or crotonoyloxy.

The alkyl group or alkoxy group preferably has 1 to 24 carbon atoms, especially 1 to 12 carbon atoms.

Examples of the alkyl group include unsubstituted alkyl groups such as methyl, ethyl, n-pentyl, n-hexyl, n-heptyl, n-octyl, n-nonyl, n-decyl, n-undecyl, n-dodecyl, isopropyl, isobutyl, sec-butyl, t-amyl and 2-ethylhexyl; 1to 4 alkoxy groups-substituted alkyl groups such as 2-methoxyethyl, 2-(2-methoxyethoxy)ethyl, 2-[2-(2-methoxyethoxy)ethoxy] ethyl, 2-n-butoxyethyl, 2-ethoxyethyl, 2-(2-ethoxyethoxy) ethyl, 3-methoxypropyl, 3-ethoxypropyl, 3-n-propyloxypropyl, 3-benzyloxypropyl and 2-methylbutyloxymethyl; aralkyl groups such as 2-phenylethyl and 2-(4-n-butyloxyphenyl)ethyl; vinylalkyl groups such as vinylmethyl, 2-vinylethyl, 5-vinylpentyl, 7-vinylheptyl and 8-vinyloctyl; vinyloxyalkyl groups such as 2-vinyloxyethyl, 5-vinyloxypentyl, 6-vinyloxyhexyl, 7-vinyloxyheptyl and 8-vinyloxyoctyl; oxiranylalkyl groups such as 3,4-epoxybutyl, 4,5-epoxypentyl, 5,6-epoxyhexyl, 6,7-epoxyheptyl, 7,8-epoxyoctyl and 6,7-epoxyoctyl; acryloyloxyalkyl groups such as 2-acryloyloxyethyl, 3-acryloyloxypropyl, 4-acryloyloxybutyl, 5-acryloyloxypentyl, 6-acryloyloxyhexyl, 7-acryloyloxyheptyl and 8-acryloyloxyoctyl; methacryloyloxyalkyl groups such as 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl and 8-methacryloyloxyoctyl; and crotonoyloxyalkyl groups such as 2-crotonoyloxyethyl, 3-crotonoyloxypropyl, 4-crotonoyloxybutyl, 5-crotonoyloxypentyl, 6-crotonoyloxyhexyl, 7-crotonoyloxyheptyl and 8-crotonoyloxyoctyl.

The group of $OR^{21}$ preferably is bonded to the benzene ring at the 3- or 4- position.

The polyvinyl alcohol preferably has a recurring unit having the group in an amount of 0.1 to 10 molar % (preferably 0.1 to 5 molar %) based on a total amount of recurring units of the polyvinyl alcohol.

The group having the formula (II) is incorporated into polyvinyl alcohol by reacting the carboxylic acid derivative having the formula (IIa) with the polyvinyl alcohol.

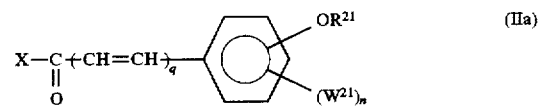

In the formula (IIa), $R^{21}$, $W^{21}$, n and q have the same meanings as in the formula (II). X represents a group enabling activation of X—CO— portion. Examples of X include groups for forming an activated ester bonding such as 4-nitrophenoxy and N-oxysuccinic acid imide; groups for forming acid anhydride such as symmetric acid anhydride type-groups (e.g., alkylcarbonyloxy and arylcarbonyloxy), and a mixed acid hydride type-groups (e.g., methanesulfonyloxy, trifluoroacetyloxy and ethyloxycarbonyloxy); and groups for forming acid halide such as Cl and Br. The compound having the formula (IIa) may not be necessarily isolated. In more detail, the compound can be employed in the form of a reaction solution containing the compound. Preferred are mixed acid hydride type-groups and groups for forming acid halide, and especially methanesulfonyloxy and Cl are preferred. Examples of X are described in "Synthesis of Peptide", N. Izumiya, Chapter 5, Maruzen, 1975).

Examples of compounds of the formula (IIa) in the case that X is OH (i.e., acid type), are described below:

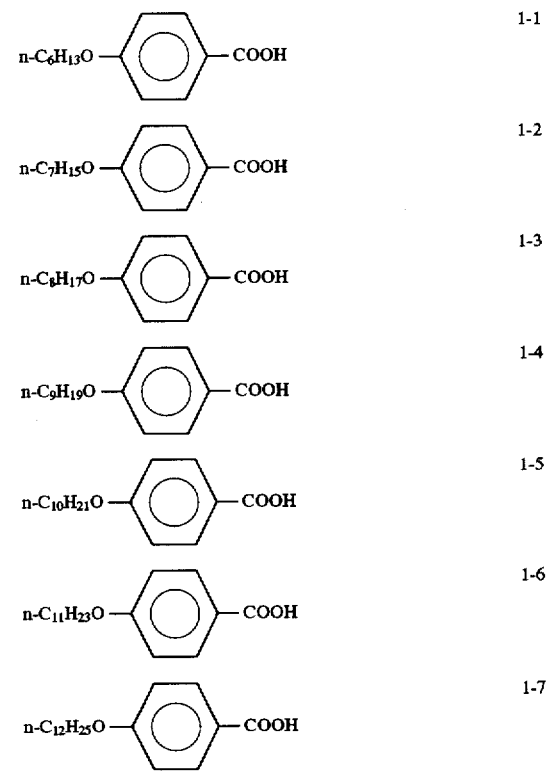

-continued
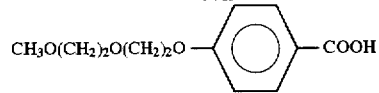 1-8
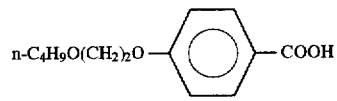 1-9
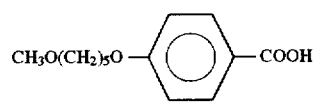 1-10
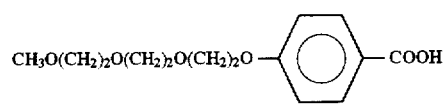 1-11
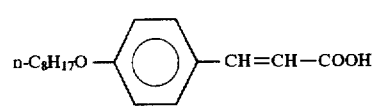 1-12
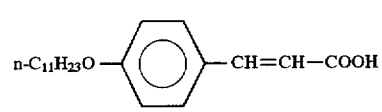 1-13
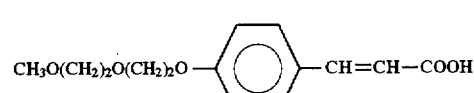 1-14
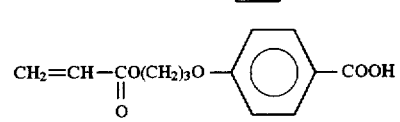 2-1
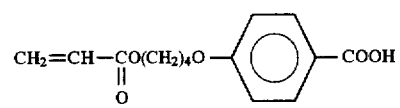 2-2
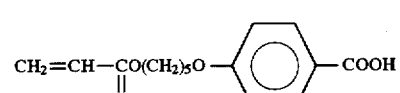 2-3
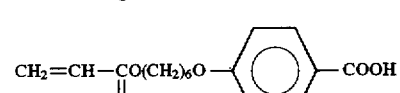 2-4
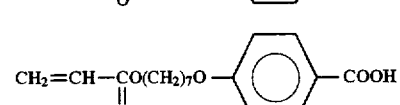 2-5
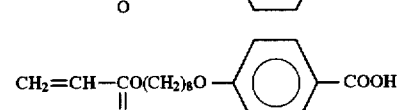 2-6
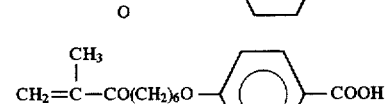 2-7
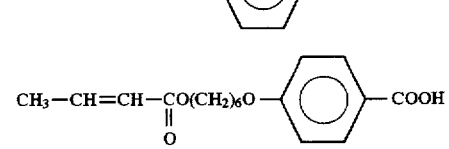 2-8
-continued
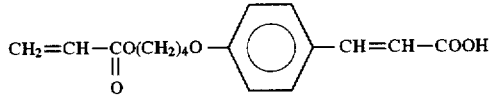 2-9
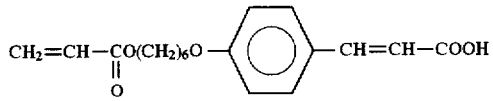 2-10
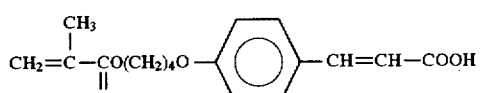 2-11
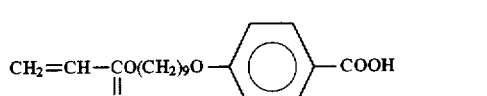 2-12
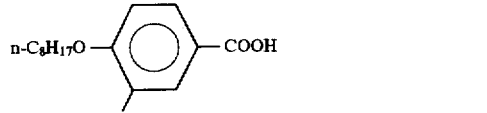 3-1
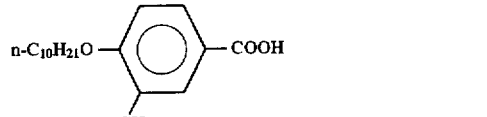 3-2
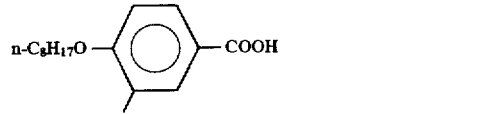 3-3
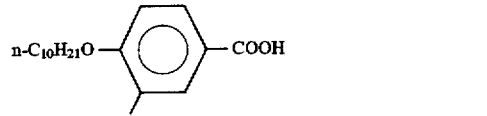 3-4
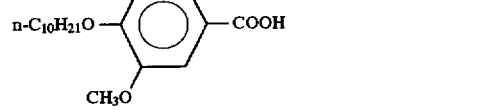 3-5
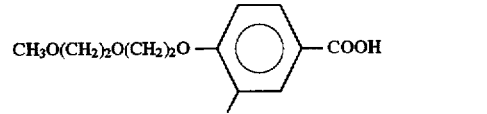 3-6
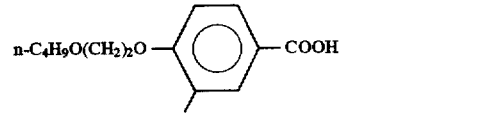 3-7
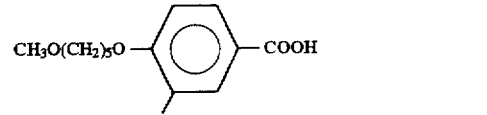 3-8

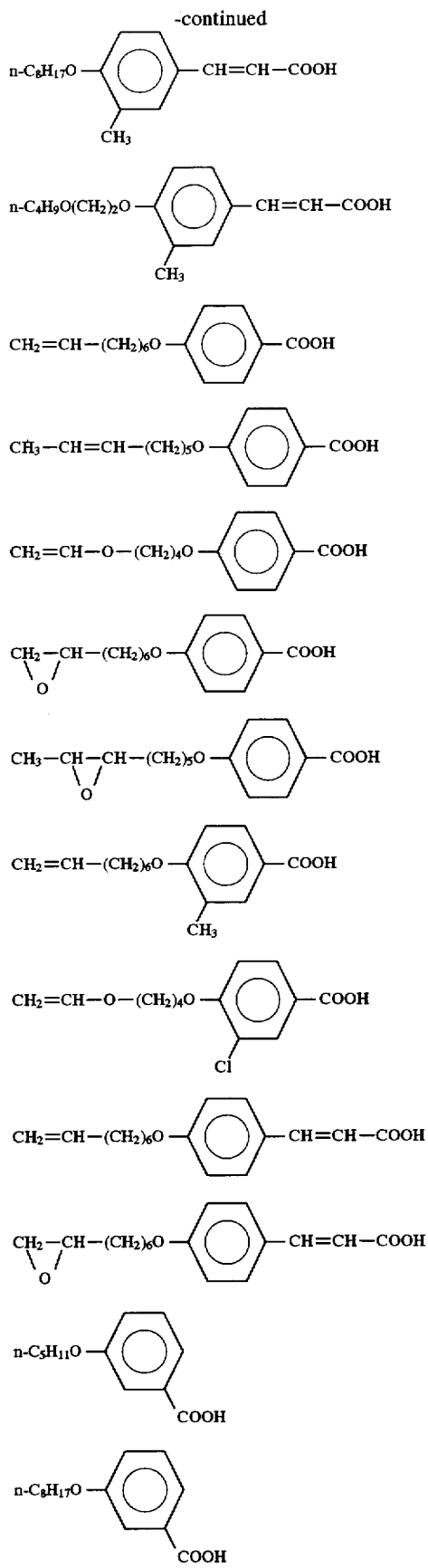

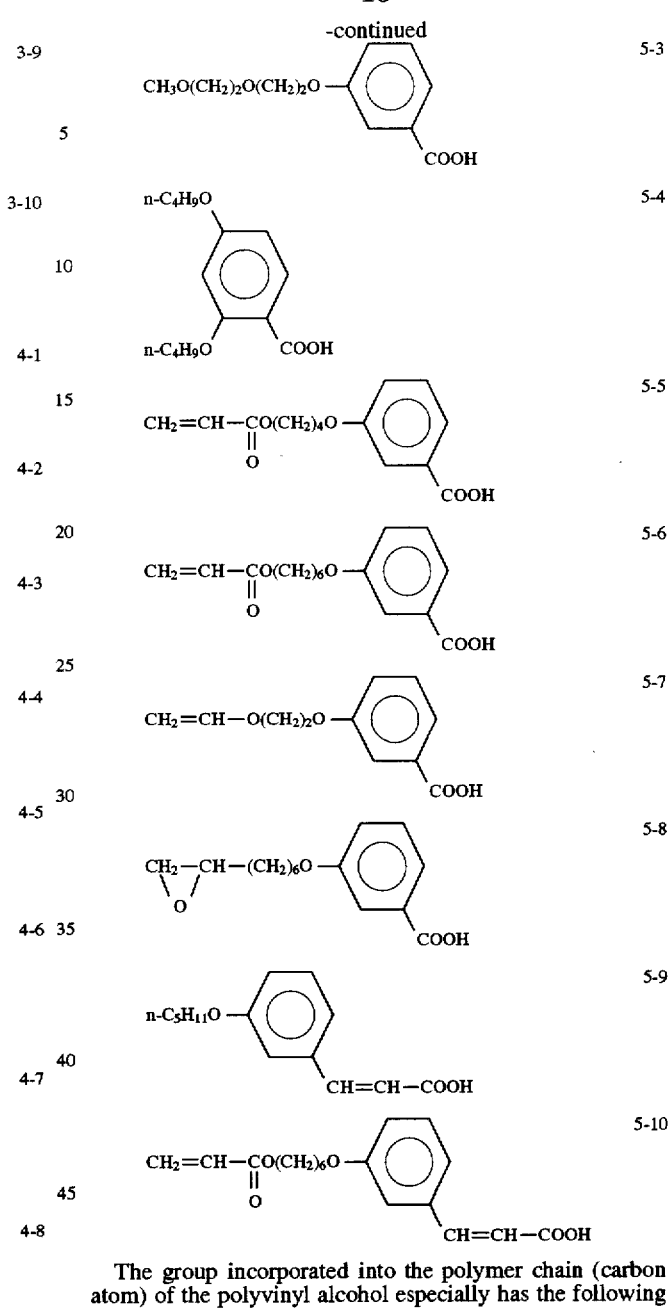

The group incorporated into the polymer chain (carbon atom) of the polyvinyl alcohol especially has the following group (IV):

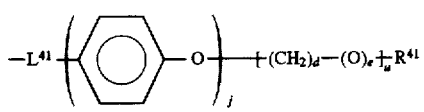

In the formula (IV), $L^{41}$ represents a urethane bonding, an acetal bonding or an ester bonding. $R^{41}$ generally represents vinyl, acryloyl, methacryloyl, crotonoyl, styryl, oxiranyl or aziridinyl, and especially acryloyl or methacryloyl, j and e generally are 0 or 1, d is an integer of 2 to 24 (especially an integer of 2 to 10), and u is an integer of 0 to 4.

Compounds having the group to be introduced into polyvinyl alcohol or denatured polyvinyl alcohol, which contains the compounds of the formulae (IIa) mentioned above, are reacted with the polyvinyl alcohol, whereby the polyvinyl alcohol having specific group of the invention can be obtained.

The polyvinyl alcohol or denatured polyvinyl alcohol employed in reaction with the compound having specific group generally has saponification degree in the range of 70 to 100%. Examples of the polyvinyl alcohols include polyvinyl alcohols which are not denatured, polyvinyl alcohols denatured by copolymerization having a group such as —COONa, —Si(OH)$_3$, —N(CH$_3$)$_3$·Cl, C$_9$H$_{19}$COO—, —SO$_3$Na or —C$_{12}$H$_{25}$; polyvinyl alcohols denatured by incorporation of chain-transfer agent employed in copolymerization having a terminated group such as —COONa, —SH or C$_{12}$H$_{25}$S—; and polyvinyl alcohols denatured by block-copolymerization having a group such as —COOH, —CONH$_2$, —COOR (R: alkyl) or C$_6$H$_5$—. Preferred are polyvinyl alcohols which are not denatured, and denatured polyvinyl alcohol having alkylthio group (C$_{12}$H$_{25}$S—). A polymerization degree of the above polyvinyl alcohol preferably is in the range of 100 to 3,000. The saponification degree preferably is in the range of 80 to 100%, especially in the range of 85 to 95%.

Examples of the polyvinyl alcohol of the invention are given below.

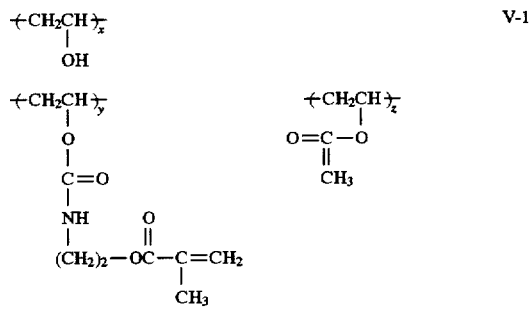

V-1

In the formula V-1, examples of x, y and z are described below:

|  | x (molar %) | y (molar %) | z (molar %) |
|---|---|---|---|
| Polymer No. 1 | 86.3 | 1.7 | 12 |
| Polymer No. 2 | 85.0 | 3.0 | 12 |
| Polymer No. 3 | 87.7 | 0.3 | 12 |
| Polymer No. 4 | 70.0 | 18.0 | 12 |
| Polymer No. 5 | 86.9 | 1.1 | 12 |
| Polymer No. 6 | 98.5 | 0.5 | 1 |
| Polymer No. 7 | 97.8 | 0.2 | 2 |
| Polymer No. 8 | 96.5 | 2.5 | 1 |
| Polymer No. 9 | 94.9 | 4.1 | 1 |

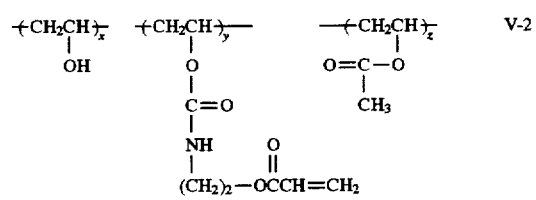

V-2

In the formula V-2, examples of x, y and z are described below:

|  | x (molar %) | y (molar %) | z (molar %) |
|---|---|---|---|
| Polymer No. 10 | 86.3 | 1.7 | 12 |
| Polymer No. 11 | 81.7 | 0.3 | 18 |
| Polymer No. 11a | 87.7 | 0.3 | 12 |
| Polymer No. 12 | 83.0 | 5.0 | 12 |
| Polymer No. 13 | 89.0 | 10.0 | 1 |
| Polymer No. 13a | 78.0 | 10.0 | 12 |

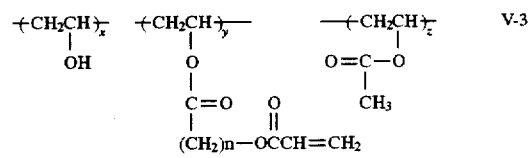

V-3

In the formula V-3, examples of n, x, y and z are described below:

|  | n (number) | x (molar %) | y (molar %) | z (molar %) |
|---|---|---|---|---|
| Polymer No. 14 | 2 | 80.3 | 1.7 | 18 |
| Polymer No. 15 | 3 | 87.5 | 0.5 | 12 |
| Polymer No. 16 | 4 | 94.0 | 5.0 | 1 |
| Polymer No. 16a | 4 | 83.0 | 5.0 | 12 |
| Polymer No. 17 | 5 | 86.9 | 1.1 | 12 |
| Polymer No. 18 | 6 | 87.7 | 0.3 | 12 |

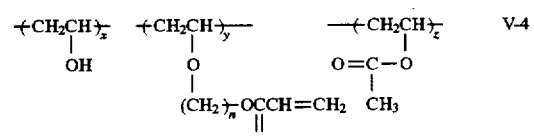

V-4

In the formula V-4, examples of n, x, y and z are described below:

|  | n (number) | x (molar %) | y (molar %) | z (molar %) |
|---|---|---|---|---|
| Polymer No. 19 | 2 | 87.8 | 0.2 | 12 |
| Polymer No. 20 | 2 | 87.5 | 0.5 | 12 |
| Polymer No. 21 | 3 | 94.4 | 0.6 | 5 |
| Polymer No. 21a | 3 | 87.4 | 0.6 | 12 |
| Polymer No. 22 | 4 | 86.4 | 1.6 | 12 |
| Polymer No. 23 | 5 | 96.0 | 2.0 | 2 |
| Polymer No. 23a | 5 | 86.0 | 2.0 | 12 |
| Polymer No. 24 | 6 | 84.8 | 3.2 | 12 |

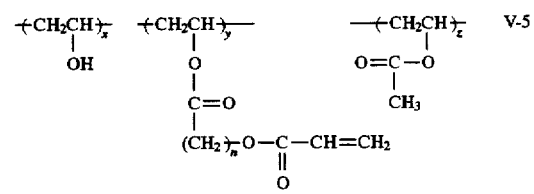

V-5

In the formula V-5, examples of n, x, y and z are described below:

|  | n (number) | x (molar %) | y (molar %) | z (molar %) |
|---|---|---|---|---|
| Polymer No. 25 | 2 | 87.5 | 0.5 | 12 |
| Polymer No. 26 | 3 | 97.4 | 0.6 | 2 |

-continued

| | n (number) | x (molar %) | y (molar %) | z (molar %) |
|---|---|---|---|---|
| Polymer No. 26a | 3 | 87.4 | 0.6 | 12 |
| Polymer No. 27 | 4 | 86.4 | 1.6 | 12 |
| Polymer No. 28 | 5 | 80.0 | 2.0 | 18 |
| Polymer No. 29 | 6 | 84.8 | 3.2 | 12 |

$$-(CH_2CH)_x\!-\!(Y)_y\!-\!(CH_2CH)_z-\qquad\text{V-6}$$
with OH on first unit and O–C(=O)–CH₃ on third unit In the formula V-6, examples of Y, x, y and z are described below:

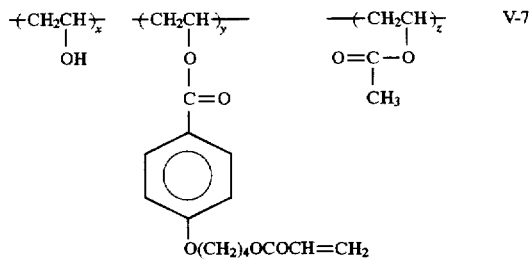

In the formula V-7, examples of x, y and z are described below:

| | Y | x | y (molar %) | z |
|---|---|---|---|---|
| Polymer No. 30 | —CH₂CH— with O–C(=O)–NH–(CH₂)₅–CH(–O–)CH₂ (epoxide) | 86.3 | 1.7 | 12 |
| Polymer No. 31 | —CH₂CH— with O–C(=O)–(CH₂)₅–O–CH(–NH–)CH₂ (aziridine) | 97.3 | 1.7 | 1 |
| Polymer No. 32 | —CH₂CH— with O–C(=O)–(CH₂)₆–CH(–O–)CH₂ (epoxide) | 87.4 | 0.6 | 12 |
| Polymer No. 33 | —CH₂CH— with O–C(=O)–(CH₂)₂–C(=O)–O–C₆H₄–CH=CH₂ | 80.8 | 1.2 | 18 |
| Polymer No. 34 | —CH₂CH— with O–C(=O)–CH=CH₂ | 86.3 | 1.7 | 12 |

| | x (molar %) | y (molar %) | z (molar %) |
|---|---|---|---|
| Polymer No. 35 | 87.8 | 0.2 | 12 |
| Polymer No. 36 | 88.0 | 0.003 | 12 |
| Polymer No. 37 | 87.86 | 0.14 | 12 |
| Polymer No. 38 | 87.94 | 0.06 | 12 |
| Polymer No. 39 | 87.2 | 0.8 | 12 |

-continued

| | x (molar %) | y (molar %) | z (molar %) |
|---|---|---|---|
| Polymer No. 40 | 98.5 | 0.5 | 1 |
| Polymer No. 41 | 97.8 | 0.2 | 2 |
| Polymer No. 42 | 96.5 | 2.5 | 1 |
| Polymer No. 43 | 94.9 | 4.1 | 1 |
| Polymer No. E | 86.9 | 1.1 | 12 |
| Polymer No. F | 98.5 | 0.5 | 1 |

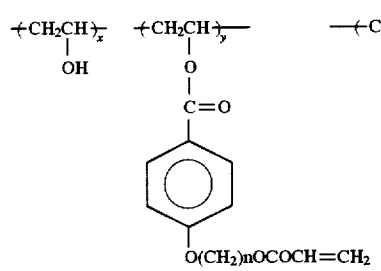
V-8

In the formula V-8, examples of n, x, y and z are described below:

| | n (number) | x (molar %) | y (molar %) | z (molar %) |
|---|---|---|---|---|
| Polymer No. 44 | 3 | 87.8 | 0.2 | 12 |
| Polymer No. 45 | 5 | 87.85 | 0.15 | 12 |
| Polymer No. 46 | 6 | 87.7 | 0.3 | 12 |
| Polymer No. 47 | 8 | 87.7 | 0.3 | 12 |

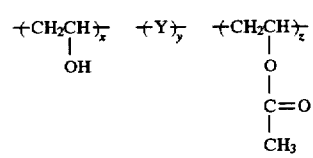
V-9

In the formula V-9, examples of Y, x, y and z are described below:

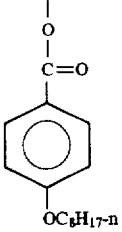

-continued

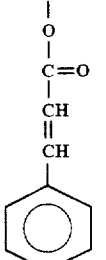

| | Y | x (molar %) | y (molar %) | z (molar %) |
|---|---|---|---|---|
| Polymer No. 49 | (see structure above) | 84.2 | 0.8 | 15 |
| Polymer No. 50 | (see structure above) | 84.9 | 3.1 | 12 |
| Polymer No. 51 | (see structure above) | 87.5 | 2.5 | 10 |

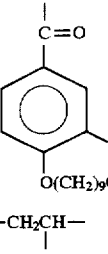

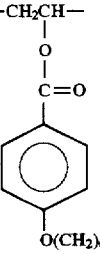

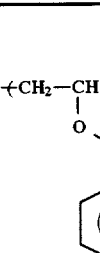
V-10

In the formula V-10, examples of n, R, x, y and z are described below:

| | n (number) | R | x (molar %) | y (molar %) | z (molar %) |
|---|---|---|---|---|---|
| Polymer No. 52 | 6 | H | 86.4 | 1.6 | 12 |
| Polymer No. 53 | 4 | H | 87.2 | 0.8 | 12 |
| Polymer No. 54 | 4 | H | 84.7 | 3.3 | 12 |
| Polymer No. 55 | 5 | $CH_3$ | 78.8 | 6.2 | 15 |
| Polymer No. 56 | 9 | $CH_3$ | 94.2 | 3.8 | 2 |
| Polymer No. 57 | 3 | H | 85.0 | 5.0 | 10 |

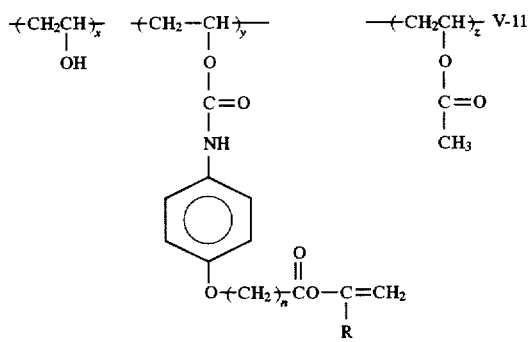

In the formula V-11, examples of n, R, x, y and z are described below:

|  | n (number) | R | x (molar %) | y (molar %) | z (molar %) |
|---|---|---|---|---|---|
| Polymer No. 58 | 2 | H | 87.5 | 2.5 | 10 |
| Polymer No. 59 | 4 | H | 84.5 | 0.5 | 15 |
| Polymer No. 60 | 5 | $CH_3$ | 97.8 | 0.2 | 2 |
| Polymer No. 61 | 6 | $CH_3$ | 94.5 | 4.1 | 1 |
| Polymer No. 62 | 9 | H | 97.3 | 1.7 | 1 |

The denatured polyvinyl alcohols mentioned above can be obtained by reacting polyvinyl alcohol with a compound (e.g., the compound of the formula (IIa)) which has the group portion of the specific unit (unit of y or y1) of the formula (I) or (III) or the group of the formula (II), the group being capable of forming ester, urethane or acetal bonding through reaction with polyvinyl alcohol.

As solvents for dissolving the polyvinyl alcohol and the compound having the above group, various solvents ranging from polar solvents to nonpolar solvents can be employed. Examples of the solvents include polar solvents such as N,N-dimethylformamide (DMF), dimethylsulfoxide (DMSO), N,N-dimethylacetoamide and pyridine; ethers such as terahydrofuran and 1,2-dimethoxyethane; and halogenated hydrocarbons such as dichloromethane and chloroform. The solvents may be employed singly or in combination. Preferred are DMSO and ethers.

The reaction of the compound with polyvinyl alcohol can be conducted using catalyst if desired. In the case of esterification using a compound having a mixed acid hydride type-group or group for forming acid halide, inorganic or organic alkali catalysts can be employed. Examples of the catalysts include hydroxides such as sodium hydroxide, potassium hydroxide and ammonium hydroxide, alkoxides such as sodium methoxide, sodium ethoxide and potassium t-butoxide; hydrogenated metals such as sodium hydride and calcium hydride; amines such as pyridine, triethylamine, piperidine and 1,8-diazabicyclo[5,4,0]-7-undecene (DBU); carbonates (salts) such as sodium carbonate, potassium carbonate and sodium hydrogencarbonate; and acetates (salts) such as sodium acetate and potassium acetate. Preferred are amines, which may be employed as solvent.

Also in the case of forming urethane bonding using an isocyanate compound, catalysts can be employed. Examples of the catalysts include alkoxides such as sodium methoxide, sodium ethoxide and potassium t-butoxide; metal compounds such as di-n-butyltin dilaurate, tin octanoate and zinc acetylacetonate; and amines such as pyridine, triethylamine, piperidine and 1,8-diazabicyclo[5,4,0]-7-undecene (DBU), teramethylbutane diamine (TMBDA) and 1,4-diaza[2,2,2] bicyclooctane.

Also in the case of forming acetal bonding using an aldehyde compound, catalysts can be employed. Examples of the catalysts include mineral acids such as sulfuric acid and hydrochloric acid; carboxylic acids such as chloroacetic acid, trifluoroacetic acid and salicylic acid and its derivatives; sulfonic acids such as methanesulfonic acid, benzenesulfonic acid and p-tolunesulfonic acid; boron trifluoride; phosphorus pentaoxide; ion-exchange resin (e.g., Amberlist).

The reaction between the compound having the specific group mentioned above and a polyvinyl alcohol or denatured polyvinyl alcohol is generally conducted at a temperature of $-80°$ to $150°$ C., preferably $-20°$ to $120°$ C., and especially $-5°$ to $900°$ C. In the reaction, ratio of the compound and the recurring unit of polyvinyl alcohol generally is 1/100 to 1/1 by molar ratio (compound/recurring unit of PVA), and preferably 1/50 to 1/5.

In order to obtain the aimed polymer (of the invention), the resultant reaction solution is generally purified by means of a reprecipitation method, a dialysis method or a freeze-drying method. These methods are generally conducted in combination or repeatedly.

Synthetic examples of the polyvinyl alcohols of the invention are described below.

[Synthetic example 1]

Synthesis of Polymer No. 1 (mentioned above)

In a 300-ml three-necked flask equipped with a stirrer, 14.7 g of polyvinyl alcohol (saponification value: 88 molar %; MP-203 available from Kuraray Co., Ltd.) and 100 ml of dimethylsulfoxide (DMSO; having been dehydrated using Molecular Sieve 4A) were placed, and stirred at room temperature to dissolve the polyvinyl alcohol in dimethylsulfoxide, whereby a PVA solution was obtained. The PVA solution was heated to $70°$ C., and 15 ml of a dimethylsulfoxide solution of methacryloyloxyethylisocyanate (0.776 g) was dropwise added to the PVA solution. After stirring for 2 hours, the resultant reaction solution was filtered through a paper towel to remove impurities. The filtered reaction solution was dropwise added with stirring to 1.25 liter of ethyl acetate to precipitate a polymer. The polymer was separated from the solution by filtration. The polymer was added to 600 ml of methanol and was washed with stirring. The polymer was then separated by filtration and dried whereby 14.0 g of a massive polymer (polymer No. 1; yield: 91%) was obtained.

[Data of the polymer No. 1]

NMR spectrum (solvent: $DMSO-d_6$)

The spectrum showed signals assigned to protons of main chain, acetyl group and hydroxyl group of the polymer, and further showed signals assigned to proton of vinyl group as given below, that MP-203 did not show.

$\delta=5.7$ ppm, 6.1 ppm (assigned to proton of vinyl group)

Visible absorption spectrum

In a 50-ml measuring flask, 0.015 g of the polymer was placed, and distilled water was added to the polymer to prepare a 0.03% aqueous polymer solution. A visible absorption spectrum of the solution was measured in a ultraviolet-visible spectrophotometer (UV-2200, available from Shimadzu Seisakusyo, Ltd.).

Wavelength of absorption maximum: 202 nm

Absorbance (202 nm): 0.839

A visible absorption spectrum of the polyvinyl alcohol MP-203 (raw material) was measured in the same manner as above. The measurement showed the following visible absorption spectrum.

Absorbance (202 nm): 0.504

Determination of methacryloyloxy group incorporation ratio (y)

Methacryloyloxyethylisocyanate used in the synthesis was reacted with methanol to produce a urethane compound.

The urethane compound was dissolved in methanol to prepare a urethane compound $1 \times 10^{-4}$M methanol solution. A visible absorption spectrum of the solution was measured in the same manner as above.

Wavelength of absorption maximum: 202 nm
Absorbance (202 nm): 0.903
Molecular extinction coefficient: $8.42 \times 10^{-4}$M·cm The obtained data reveals that increase of absorbance (202 nm) of polymer No. 1 is derived from incorporation of methacryloyloxyethylisocyanate into hydroxyl group of the polyvinyl alcohol. Therefore, methacryloyloxy group incorporation ratio (y) was calculated based on the data of absorbances (202 nm) to determine y (=1.7).

[Synthetic examples 2, 3 and 4]

Synthesis of Polymer Nos. 2, 3 and 4 (mentioned above)

Polymer Nos. 2, 3 and 4 were obtained in the same manner as in Synthetic example 1. The visible absorption spectra were measured in the same manner as above.

Polymer No. 2
Wavelength of absorption maximum: 202 nm
Absorbance (202 nm): 1.423
y=3.0

Polymer No. 3
Wavelength of absorption maximum: 202 nm
Absorbance (202 nm): 0.653
y=0.3

Polymer No. 4 (0.001% aqueous solution)
Wavelength of absorption maximum: 202 nm
Absorbance (202 nm): 1.532 (0.001% aqueous solution)
y=18.0

[Synthetic example 5]

Synthesis of Polymer No. 5 (mentioned above)

Procedures in Synthetic example 1 were repeated to prepare Polymer No. 5, except for changing the reaction temperature from 70° C. to room temperature.

[Synthetic examples 6 to 34]

Synthesis of Polymer Nos. 6 to 34 (mentioned above)

Polymer Nos. 6 to 34 were obtained basically according to procedures in Synthetic example 1.

[Synthetic example 35]

Synthesis of Polymer No. 35 (mentioned above)

In a 500-ml three-necked flask equipped with a stirrer, 26.4 g of polyvinyl alcohol (saponification value: 88 molar %; MP-203 available from Kuraray Co., Ltd.) and 225 ml of dimethylsulfoxide (DMSO; having been dehydrated using Molecular sieve 4A) were placed, and stirred at room temperature to dissolve the polyvinyl alcohol in dimethylsulfoxide, whereby a PVA solution was obtained.

Separately, in a 50-ml three-necked flask equipped with a stirrer, 1.55 ml (20 millimoles) of methanesulfonylchloride and 20 ml of tetrahydrofuran (THF) were placed to prepare a methanesulfonylchloride solution. A solution of 5.28 g of 4-(4-acryloyloxybutoxy)benzoic acid (compound No. 2—2; 20 millimoles) and 3.42 ml (20millimoles) of diisopropylethylamine in 20 ml of THF was dropwise added with stirring at a temperature of 0° C. to the methanesulfonylchloride solution. After the addition was complete, the reaction mixture was stirred at a temperature of 0° C. for 30 minutes to prepare a mixed acid anhydride of compound No. 2—2 and methanesulfonylchloride.

To the PVA solution obtained previously, 3.42 ml (20 millimoles) of diisopropylethylamine and 0.24 g (2 millimoles) of dimethylaminopyridine were added to prepare a solution. To the solution, the above mixed acid anhydride was slowly added with stirring at room temperature, and stirred at room temperature for 6 hours. Thereafter, the reaction solution was allowed to stand overnight. The color of the resultant reaction solution was a slightly yellow. The resultant reaction was filtered through a paper towel to remove impurities. The filtered reaction solution was dropwise added with stirring to 2.25 liter of ethyl acetate to precipitate a polymer. The polymer was white crude precipitate. The polymer was then separated by filtration and dried whereby 22.1 g of a massive polymer (polymer No. 35; yield: 84%) was obtained.

[Data of the polymer No. 35]

NMR spectrum (solvent: DMSO-$d_6$)

The spectrum showed signals assigned to protons of main chain, acetyl group and hydroxyl group of the polymer, and further showed signals assigned to protons of phenylene group and vinyl group as given below, that MP-203 did not show.

$\delta$=7.9 ppm, 7.0 ppm (assigned to proton of phenylene group)

$\delta$=6.3 ppm, 6.2 ppm, 5.9 ppm (assigned to proton of vinyl group)

Visible absorption spectrum

In a 100-ml measuring flask, 0.1 g of the polymer was placed, and distilled water was added to the polymer to prepare a 0.1% aqueous polymer solution. A visible absorption spectrum of the solution was measured in a ultraviolet-visible spectrophotometer (UV-2200, available from Shimadzu Seisakusyo, Ltd.).

Wavelength of absorption maximum: 260 nm
Absorbance (260 nm): 0.788

A visible absorption spectrum of the polyvinyl alcohol MP-203 (raw material) was measured in the same manner as above. No absorption maximum was found in the range of 220 to 400 nm, and a weak absorption which gradually lowers from shorter wavelength to longer wavelength was found in the range. The measurement showed the following visible absorption spectrum.

Absorbance (260 nm): 0.011

Determination of acryloyloxy group incorporation ratio (y)

The compound No. 2—2 used in the synthesis example was reacted with methanol to produce its methyl ester compound. The methyl ester compound was dissolved in methanol to prepare the methyl ester compound methanol solution ($1 \times 10^{-4}$M). A visible absorption spectrum of the solution was measured in the same manner as above.

Wavelength of absorption maximum ($\lambda$max): 260 nm
Absorbance (260 nm): 1.84
Molecular extinction coefficient ($\epsilon$): $1.84 \times 10^4$M$^{-1}$·cm The obtained data reveals that increase of absorbance (260 nm) of polymer No. 35 is derived from incorporation of compound No. 2—2 into hydroxyl group of the polyvinyl alcohol. Therefore, acryloyloxy group incorporation ratio (y) was calculated based on the data of absorbances (260 nm) to determine y (=0.21).

[Synthetic examples 36, 37 and 38]

Synthesis of Polymer Nos. 36, 37 and 38 (mentioned above)

Procedures in Synthetic example 35 were repeated to prepare Polymer Nos. 36, 37 and 38, except for changing the amounts of the used materials to those shown in the following Table.

TABLE

| Polymer | No. 36 | No. 37 | No. 38 |
|---|---|---|---|
| [Esterification of PVA] | | | |
| Polyvinyl alcohol MP-203 (g) | 26.4 | 26.4 | 26.4 |
| Dimethylsulfoxide (DMSO; ml) | 225 | 225 | 225 |
| Diisopropylethylamine (ml) | 0.34 | 1.71 | 10.3 |
| Dimethylaminopyridine (g) | 0.024 | 0.12 | 0.72 |
| [Preparation of mixed acid anhydride] | | | |
| Methanesulfonylchloride (g) | 0.16 | 0.78 | 4.65 |
| Tetrahydrofuran (THF; ml) | 2 | 10 | 60 |
| Compound No. 2-2 (g) | 0.53 | 2.64 | 15.84 |
| Diisopropylethylamine (ml) | 0.34 | 1.71 | 10.3 |
| THF (ml) | 2 | 10 | 60 |
| Yield (g/%) | 21.1/80 | 23.5/89 | 22.3/84 |

The visible absorption spectra of the polymer Nos. 36 to 38 were measured in the same manner as above.
Polymer No. 36
Wavelength of absorption maximum: 260 nm
Absorbance (260 nm): 0.023
y=0.003
Polymer No. 37
Wavelength of absorption maximum: 260 nm
Absorbance (260 nm): 0.553
y=0.14
Polymer No. 38 (0.001% aqueous solution)
Wavelength of absorption maximum: 260 nm
Absorbance (260 nm): 0.132
y=0.06
[Synthetic example E]
Synthesis of Polymer No. E (mentioned above)
Procedures in Synthetic example 38 were repeated to prepare Polymer No. E, except for changing conditions of the esterification reaction from room temperature for 6 hours to a temperature of 45° C. for 8 hours.
[Synthetic example 39]
Synthesis of Polymer No. 39 (mentioned above)
In a 500-ml three-necked flask equipped with a stirrer, 26.4 g of polyvinyl alcohol (saponification value: 88 molar %; MP-203 available from Kuraray Co., Ltd.) and 168 ml of dimethylsulfoxide (DMSO; having been dehydrated using Molecular Sieve 4A) were placed, and stirred at room temperature to dissolve the polyvinyl alcohol in dimethylsulfoxide, whereby a PVA solution was obtained.

Separately, in a 200-ml three-necked flask equipped with a stirrer, 3.24 ml (42 millimoles) of methanesulfonylchloride and 21 ml of tetrahydrofuran (THF) were placed to prepare a methanesulfonylchloride solution. A solution of 11.1 g (42 millimoles) of 4-(4-acryloyloxybutoxy)benzoic acid (compound No. 2—2) and 7.32 ml (42millimoles) of diisopropylethylamine in 42 ml of THF was dropwise added with stirring at a temperature of 0° C. to the methanesulfonylchloride solution. After the addition was complete, the reaction mixture was stirred at temperature of 0° C. for 30 minutes to prepare a mixed acid anhydride of compound No. 2—2 and methanesulfonylchloride.

To the PVA solution obtained previously, 7.32 ml (42 millimoles) of diisopropylethylamine and 0.51 g (4.2 millimoles) of 4-N,N-dimethylaminopyridine were added to prepare a solution. To the solution, the above mixed acid anhydride was dropwise added with stirring at 45° C. for one hour, and then stirred at 45° C. for 3 hours. Thereafter, the reaction solution was cooled to room temperature, and filtered through a paper towel to remove impurities. To the filtered reaction solution, 134 ml of 2-propanol was added and the resultant reaction solution was dropwise added with stirring to 1.68 liter of ethyl acetate to precipitate a polymer. The polymer was separated by filtration and placed in 700 ml of methanol for washing. The polymer was then separated by filtration and dried in vacuo at room temperature, whereby 24.0 g of a slightly yellow polymer mass (polymer No. 39; yield: 91%) was obtained.

Acryloyloxy group incorporation ratio (y) was calculated based on the data of absorbances (260 nm) in the same manner as in Synthetic Example 35 to determine y (=0.80).
[Synthetic examples 40, 41, 42 and 43]
Synthesis of Polymer Nos. 44, 45, 46 and 47 (mentioned above)
Procedures in Synthetic example 35 were repeated to prepare Polymer Nos. 44, 45, 46 and 47, except for changing the compound 2—2 to compound 2-1, compound 2-3, compound 2-4 and compound 2-6, respectively.
[Synthetic examples 44 and 45]
Synthesis of Polymer Nos. 53 and 54 (mentioned above)
In a 500-ml three-necked flask equipped with a stirrer, 44 g of polyvinyl alcohol (MP-203 available from Kuraray Co., Ltd.), 4.4 g (23 millimoles) of p-toluenesulfonic acid monohydrate and 200 ml of dimethylsulfoxide (DMSO; having been dehydrated using Molecular Sieve 4A) were placed, and stirred at room temperature to dissolve the polyvinyl alcohol in dimethylsulfoxide, whereby a PVA solution was obtained. A DMSO solution of 2.0 g (in Polymer No. 53) or 8.0 g (in Polymer No. 54) of 4-(4-acryloyloxybutyloxy)benzaldehydde and 80 ml of DMSO was added to the PVA solution and stirred at room temperature for 5 hours.

The resultant reaction solution was dropwise added with stirring to 3 liters of ethyl acetate to precipitate a polymer. The polymer was added to 1 liter of methanol and was washed with stirring. The polymer was then separated by filtration and dried in vacuo at room temperature whereby a white polymer mass (polymer No. 53, yield: 41 g, 89%; or polymer No. 54, yield: 43 g, 83%) was obtained.
[Data of the polymers Nos. 53 and 54]
NMR spectrum (solvent: DMSO-$d_6$)
The spectrum of each of the polymers showed signals assigned to protons of main chain, acetyl group and hydroxyl group of the polymer, and further showed signals assigned to protons of groups as given below, that MP-203 did not show.

$\delta$=7.3 ppm, 6.9 ppm (assigned to proton of phenylene group)

$\delta$=6.3 ppm, 6.2, 5.9 ppm (assigned to proton of vinyl group)

$\delta$=5.5 ppm (assigned to proton of acetal group)

The spectrum did not show signal assigned to proton of formyl group of the aldehyde (i.e., signal in about $\delta$=10 ppm). This reveals that the resultant polymer has an acetal bond into which the formyl group has been converted.

Visible absorption spectrum
4-(4-Acryloyloxybutyloxy)benzaldehydde was reacted with trimethylene diol to prepare an acetal compound. The acetal compound was dissolved in methanol to prepare a $1 \times 10^{-4}$M methanol solution of the compound, and a visible absorption spectrum of the solution was measured by a ultraviolet-visible spectrophotometer (UV-2200, available from Shimadzu Seisakusyo, Ltd.).
Wavelength of absorption maximum ($\lambda_{max}$) : 272 nm
Absorbance (272 nm): 1.66
Molecular extinction coefficient ($\epsilon$): $1.66 \times 10^4 M^{-1} \cdot cm$
Determination of acryloyloxy group incorporated ratio (y)
Acryloyloxy group incorporated ratio (y) was calculated based on the data of absorbances (272 nm) in the same manner as in Synthetic Example 35 to determine y (=0.8, Polymer No. 53 and =3.3 , Polymer No. 54).

The orientation layer to be provided on the transparent support comprises the specific polyvinyl alcohol of the invention including the above-mentioned polymers. The orientation layer may comprise a combination of the specific polyvinyl alcohol and at least one of other polymers which are known as polymers employable for the preparation of an orientation layer. In the combination, other polymers are generally employed in an amount of less than 90 wt.% of a total amount of the polymers, and preferably less than 70 wt.%.

Examples of polymers having a polymerizable group for the orientation layer other than the specific polyvinyl alcohol according to the invention, include polyimide having vinyl, oxiranyl or aziridinyl, and gelatin having vinyl, oxiranyl or aziridinyl. These polymers can be also prepared using a polymer into which a hydroxyl or amino group is introduced, in the same manner as in the specific polyvinyl alcohol. For example, incorporation of polymerizable group into polyimide can be conducted by reacting a carboxyl group of polyamic acid with polyhydric alcohol to attach hydroxyl groups to the plyamic acid, reacting the compound (e.g., the compound of formula (IIa) or the isocyanate compound) employed in the specific polyvinyl alcohol with the hydroxyl group and polymerizing the polyamic acid having the polymerizable group. Incorporation of the polymerizable group into gelatin can be conducted by reacting $\epsilon$-amino group of lysine residue of the gelatin with the compound (e.g., the compound of formula (IIa) or the isocyanate compound) employed in the specific polyvinyl alcohol.

Examples of known polymers for the orientation layer include polymers such as polymethyl metacrylate, acrylic acid/ methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate.

The orientation layer can be formed by coating a solution containing the specific polyvinyl alcohol over the transparent support previously described, drying to form a polymer layer and subjecting the polymer layer to orientation treatment such as rubbing procedure. Examples of the coating methods include spin coating method, dip coating method, extrusion coating method and bar-coating method.

The coated polymer layer is preferably dried at a temperature of 20° to 110° C., and especially at a temperature of 60° to 100° C. The time period for drying preferably is in the range of 1 minute to 36 hours, and especially in the range of 5 to 30 minutes. The thickness of the orientation layer preferably 0.1 to 10 μm.

The orientation layer can be formed by, for example, rubbing the polymer layer in the known manner which is conventionally employed to prepare an orientation layer of surface for liquid crystal of LCD (Liquid crystal display). In more detail, the treatment is performed to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer by the use of a rubbing roller around which a rubbing sheet such as velvet are wound. The rubbing procedure may be conducted continuously.

The optical compensatoy sheet can be prepared by forming a layer of liquid crystalline compound (optically anisotropic layer) on the orientation layer. The liquid crystalline compound may be a lod-like liquid crystalline compound or a discotic liquid crystalline compound (preferably discotic liquid crystalline compound). The liquid crystalline compound preferably has a polymerizable group in order to chemically bond to the polymer of the orientation layer.

As lod-like liquid crystalline compounds, there can be mentioned biphenyl derivatives, phenyl benzonate derivatives, benzylideneaniline derivatives, azobenzene derivatives, azoxybenzene derivatives, stilbenzene derivatives and those in which the benzene ring is replaced with cyclohexane or a hetero ring, which are described in "Chemistry of Liquid Crystal, Elements of Chemistry, vol. 22, edited by The Chemical Society of Japan, 1994". The examples include $C_aH_{2a+1}$-Ph-Ph-CN, $C_aH_{2a+1}$-Cy-Ph-CN, $C_aH_{2a+1}$-Ph-COO-Ph-CN, $C_aH_{2a+1}$-Ph-COO-Ph(F)-CN, $C_aH_{2a+1}$-Cy-COO-Ph-O($C_bH_{2b+1}$), $C_aH_{2a+1}$-Cy-Ph-O($C_bH_{2b+1}$), $C_aH_{2a+1}$-Cy-Ph-Ph-O($C_bH_{2b+1}$), or $C_aH_{2a+1}$-Cy-$C_2H_4$-Ph-Ph(F)-$C_bH_{2b+1}$ (in which Ph is phenylene, Cy is cyclohexene, Ph(F) is phenylene substituted with F, and each of a and b is an integer of 1 to 24) which has a polymerizable group (e.g., acryloyloxy, methacryloyloxy, vinyl, vinyloxy, styryl or chloroacryloyloxy); and compounds described in "Makromol. Chem., D. J. Broer et al., vol. 189, pp. 185, 1989" and "Makromol. Chem., D. J. Broer et al., vol. 190, pp. 2255, 1989"

The discotic liquid crystalline compound is characterized in that a discotic structure is located at a center of the compound as a parent core and further straight chain groups such as alkyl, alkoxy and benzoyl having a substituent are radially bonded to the compound. The feature of the parent core other than the straight chain groups (i.e., discotic compound having no substituent) can be given in the following manner.

The molecular size of the parent core is determined as follows:

1) A planner molecular structure suitable for the molecule (parent core) is designed by determining the bond distances and the bond angles (in which the standard values according to hybridization of the orbitals are employed) referring to, for example, "A Handbook of Chemistry, fourth edition, basic series, II volume, 15 chapter, edited by The Chemical Society of Japan, 1993".

2) The resultant planner molecular structure is appropriately modified by utilizing a method of molecular orbital method and a method of molecular mechanics (which are described in Gaussian 92, MOPAC 93, CHARAm/QUANTA and NM3, preferably Gaussian 92), to give an optimum structure.

3) To each of atoms constituting the molecule having the optimum structure, sphere defined by van der Waals radius is given, to picture the molecular structure.

4) A minimum rectangular parallelepiped into which the molecular structure obtained in above 3) can be incorporated is determined. The rectangular parallelepiped has three edges a, b and c.

The above procedures 3) and 4) are preferably conducted in the following manner.

3') The center of gravity of molecule having the optimum structure is placed on the origin of coordinate axes including a main axis of inertia (main axis of inertia ellipse body).

4') To each of atoms constituting the molecule having the optimum structure, sphere defined by van der Waals radius is given, to picture the molecular structure.

5) On the surfaces of the spheres defined by van der Waals radius, length in the each direction of the coordinate axes is measured. The three lengths represent a, b and c.

The molecular structure of the parent core of the discotic liquid crystalline compound can be represented, by using the above a, b and c, as a structure satisfying the conditions of a≧b≧c and a≧b≧a/2, preferably the conditions of a≧b≧c and a≧b≧0.7a. Further, the structure preferably satisfies the condition of b/2≧c.

Examples of the discotic liquid crystalline compounds employed in the invention include benzene derivatives, triphenylene derivatives, truxene derivatives, phthalocyanine derivatives, porphyrin derivatives, anthracene derivatives, azacrown derivatives, cyclohexane derivatives, β-diketene metal complex derivatives, macrocyclic compounds of phenylacetylene-type, which are described in "Chemistry of Liquid Crystal, Elements of Chemistry, vol. 22, edited by The Chemical Society of Japan, 1994". Further, cyclic compounds and those substituted with hetero atom described in "New Aromatic Chemistry, Elements of Chemistry, vol. 15, edited by The Chemical Society of Japan, 1977", can be mentioned as the examples. Furthermore, the examples include discotic molecule that a plural molecules form an aggregate by hydrogen bond or coordinate bond in the same manner as the above metal complex.

The discotic liquid crystalline compound generally has a structure that a basic structure of the above compound is located at a center of the crystal as a parent core and further straight chain groups such as alkyl, alkoxy and benzoyl having a substituent are radially bonded to the compound. As the discotic liquid crystal compounds, any discotic liquid crystalline compounds can be used, so long as the liquid crystalline compounds have a negative birefringence (negative uniaxial property) and orientation property. The discotic liquid crystalline compounds preferably has discotic nematic phase ($N_D$). Preferred examples of the discotic liquid crystalline compounds are triphenylene derivatives and truxene derivatives. The side chain preferably is an alkyl group, an alkoxy group, an alkylthio group, an acyloxy group, an alkoxycarbonyl group or a halogen atom, and especially an alkyl group, an alkoxy group, an alkylthio group or an acyloxy group. The groups are described in "Chemical Review, C. Hansh, A. Leo, R. W. Taft, vol. 91, pp. 161–195, 1991, American chemical Society". Further, these groups may have an aryl group, a heterocyclic group, an ether group, an ester group, a carbonyl group, a thioether group, a sulfoxide group, a sulfonyl group or an amide group, and especially an aryl group or a heterocyclic group.

The discotic liquid crystalline compound preferably has as a substituent a group that is capable for forming new bonding in its molecule or for linking other molecule (of the same compound or other compound), and chemically bonds to the polymer of the orientation layer. The group is one that reacts with the same kind of group to form a new bonding, or one that reacts with other group to form a new bonding. Examples of the groups are described in "Organic Functional Group Preparations, S. R. Sandler, W. Karo, Vol. 1 and Vol. 2, Academic Press, New York, London, 1968". Preferred are polymerizable groups such as a group having double or triple bond (e.g., double or triple bond consisting of carbon atoms) and groups of heterocyclic rings such as oxiranyl and aziridinyl. Especially, preferred are an acryloyl group, a vinylether group and an oxiranyl group, which are described in "Macromolecules, R. A. M. Hikmet, vol. 25, pp. 4194, 1992", "Polymer, R. A. M. Hikmet, vol. 34, 8, pp. 1763, 1993" and "Macromolecules, D. J. Broer, vol. 26, pp. 1244, 1993".

Preferred examples of the discotic liquid crystalline compound are described below.

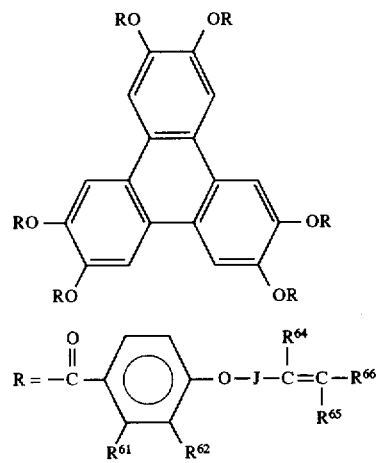

D-1-1

In the above formulae, examples of $R^{61}$, $R^{62}$, $R^{64}$, $R^{65}$, $R^{66}$ and J are described below:

| Compound | $R^{61}$ | $R^{62}$ | $R^{64}$ | $R^{65}$ | $R^{66}$ | J |
|---|---|---|---|---|---|---|
| TP-1 | H | H | H | H | H | —(CH$_2$)$_2$OCO— |
| TP-2 | H | H | H | H | H | —(CH$_2$)$_3$OCO— |
| TP-3 | H | H | H | H | H | —(CH$_2$)$_4$OCO— |
| TP-4 | H | H | H | H | H | —(CH$_2$)$_5$OCO— |
| TP-5 | H | H | H | H | H | —(CH$_2$)$_6$OCO— |
| TP-6 | H | H | H | H | H | —(CH$_2$)$_7$OCO— |
| TP-7 | H | H | H | H | H | —(CH$_2$)$_8$OCO— |
| TP-8 | H | H | H | H | CH$_3$ | —(CH$_2$)$_9$OCO— |
| TP-9 | H | H | H | H | C$_2$H$_5$ | —(CH$_2$)$_6$OCO— |
| TP-10 | CH$_3$ | H | H | H | C$_2$H$_{5H}$ | —(CH$_2$)$_6$OCO— |
| TP-11 | CH$_3$ | CH$_3$ | H | H | H | —(CH$_2$)$_2$OCO— |
| TP-12 | H | CH$_3$ | H | H | H | —(CH$_2$)$_3$OCO— |
| TP-13 | CH$_3$ | H | H | H | H | —(CH$_2$)$_4$OCO— |
| TP-14 | CH$_3$ | H | H | H | H | —(CH$_2$)$_5$OCO— |
| TP-15 | CH$_3$ | H | H | H | H | —(CH$_2$)$_6$OCO— |
| TP-16 | CH$_3$ | CH$_3$ | H | H | H | —(CH$_2$)$_7$OCO— |
| TP-17 | H | CH$_3$ | H | H | H | —(CH$_2$)$_8$OCO— |
| TP-18 | CH$_3$ | H | H | H | CH$_3$ | —(CH$_2$)$_9$OCO— |
| TP-19 | CH$_3$ | H | H | H | C$_2$H$_5$ | —(CH$_2$)$_6$OCO— |
| TP-20 | H | CH$_3$ | H | H | CH$_3$ | —(CH$_2$)$_6$OCO— |
| TP-21 | H | H | H | H | n-C$_3$H$_7$ | —(CH$_2$)$_2$OCO— |
| TP-22 | H | H | H | H | H | —(CH$_2$)$_3$OC$_2$H$_4$OCO— |
| TP-23 | H | H | H | H | H | —(C$_2$H$_4$O)$_2$C$_3$H$_6$OCO— |
| TP-24 | CH$_3$ | H | H | H | H | —(C$_2$H$_4$O)$_2$CO— |
| TP-25 | H | H | H | H | H | —(C$_2$H$_4$O)$_3$CO— |
| TP-26 | H | H | H | CH$_3$ | CH$_3$ | —(CH$_2$)$_4$OCO— |
| TP-27 | H | H | CH$_3$ | H | H | —(CH$_2$)$_5$OCO— |
| TP-28 | H | H | CH$_3$ | H | H | —(CH$_2$)$_6$OCO— |
| TP-29 | H | H | CH$_3$ | H | H | —(CH$_2$)$_7$OCO— |
| TP-30 | H | H | CH$_3$ | H | H | —(CH$_2$)$_8$OCO— |

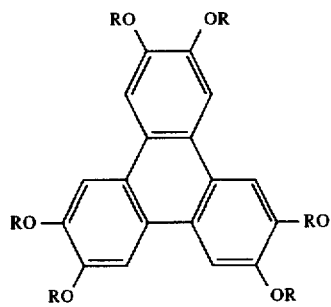

D-1-2

-continued
a) 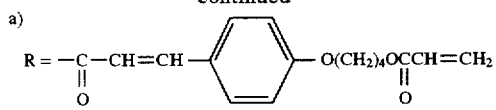
b) 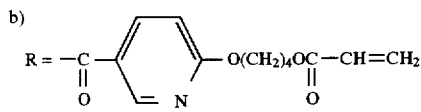
D-2
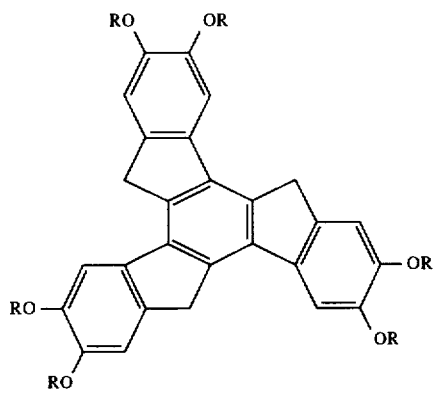
a) 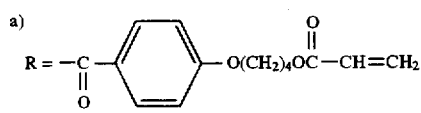
b) 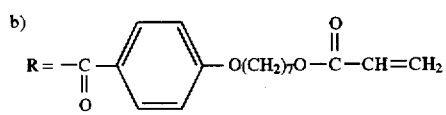
D-3
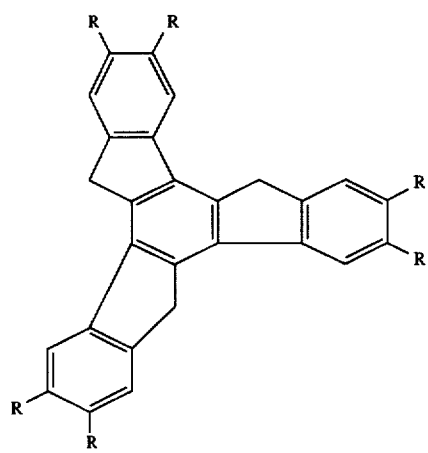
a) 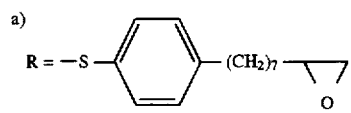
-continued
D-4
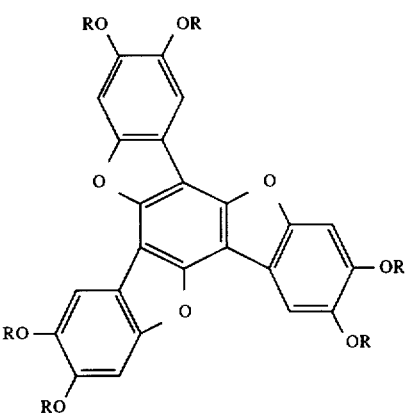
a) 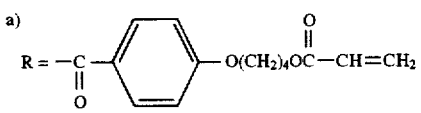
D-5
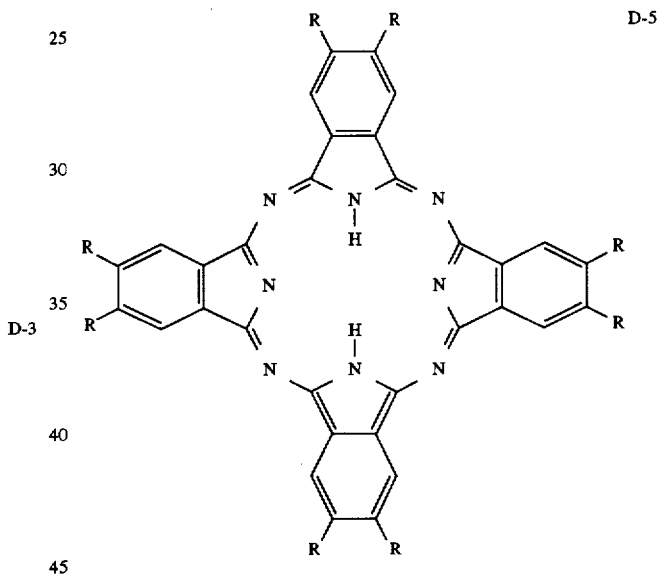
a) 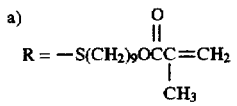

-continued

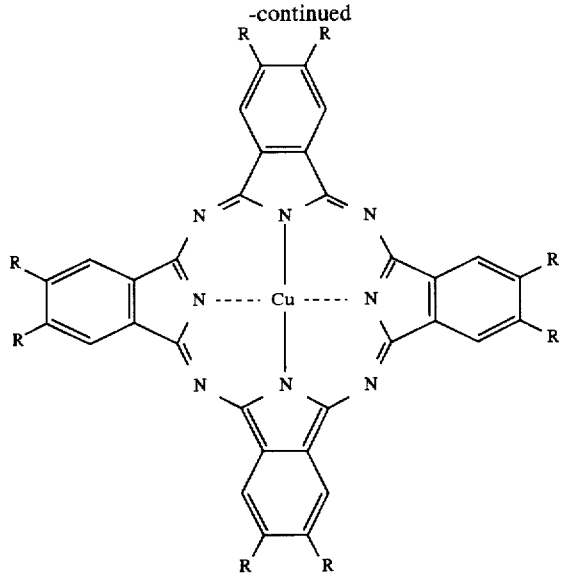

a)
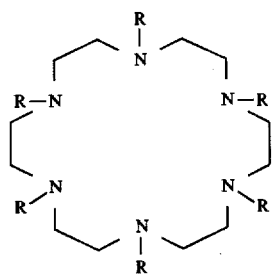

D-7

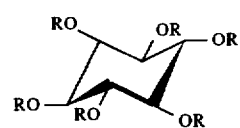

D-8

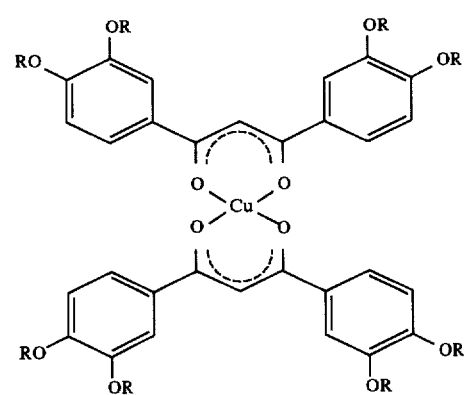

D-9

-continued

D-6 a)
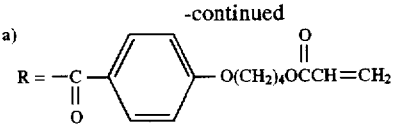

D-10
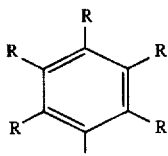

a)
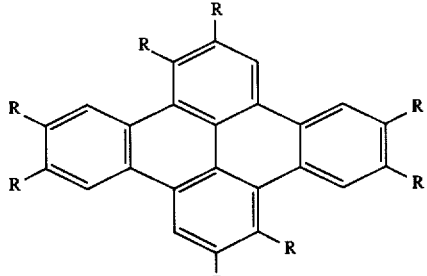

D-11

[structure D-11: hexabenzocoronene-like polycyclic aromatic with R substituents]

a)
R = —OC—C₆H₄—O(CH₂)₉OCCH=CH₂ (with carbonyl groups)

The liquid crystalline discotic compound employed for the optically anisotropic layer can be singly or in combination. The liquid crystalline discotic compound further may contain various compounds such as discotic compounds having no liquid crystalline property or other compounds (e.g., plasticizer, surface active agent, polymerizable monomer and polymer).

The optical compensatory sheet of the invention is generally prepared by forming an orientation layer of a rubbed polymer having a functional group (e.g., the specific polyvinyl alcohol of the invention) on a transparent support and forming an optically anisotropic layer on the orientation layer, as mentioned above.

The optically anisotropic layer of the invention is formed of a liquid crystalline compound, and preferably formed of a discotic liquid crystalline compound. These compounds preferably have a function group such as vinyl, oxiranyl or aziridinyl, which are, for example, shown as the above examples. The thickness of the optically anisotropic layer preferably is in the range of 0.1 to 20 μm.

The optically anisotropic layer can be generally prepared by coating a solution of the liquid crystalline compound such as discotic compound (and other compound) in a solvent on the orientation layer, dried, heating to temperature for forming a discotic nematic phase (in the case of discotic compound) and cooling with keeping the oriented condition (discotic nematic phase). Preferably, the layer can be prepared by coating a solution of a polymerizable discotic compound (and other compound) in a solvent on the orientation layer, dried, heating to a temperature for forming a discotic nematic phase, reacting or polymerizing the heated layer (e.g., by radiation of UV light) and cooling.

In the invention, the orientation layer comprises a polymer having a function group such as vinyl, oxiranyl or aziridinyl. Therefore, in the case that the optically anisotropic layer is coated on the orientation layer, and then these two layers are, for example, exposed to UV light, the two layers are chemically bonded through reaction between the functional group (e.g. vinyl) of optically anisotropic layer and that of the orientation layer. The resultant optical compensatory sheet shows excellent durability. In more detail, in the case that the optical compensatory sheet is stored or employed for a long period of time, it is scarcely found that the optically anisotropic layer is exfoliated from the orientation layer.

Hence, the functional group of the optically anisotropic layer and that of the orientation layer are generally reacted (preferably polymerized) with each other, and preferably these groups are the same (especially polymerizable groups such as vinyl and oxiranyl).

Figure 3:
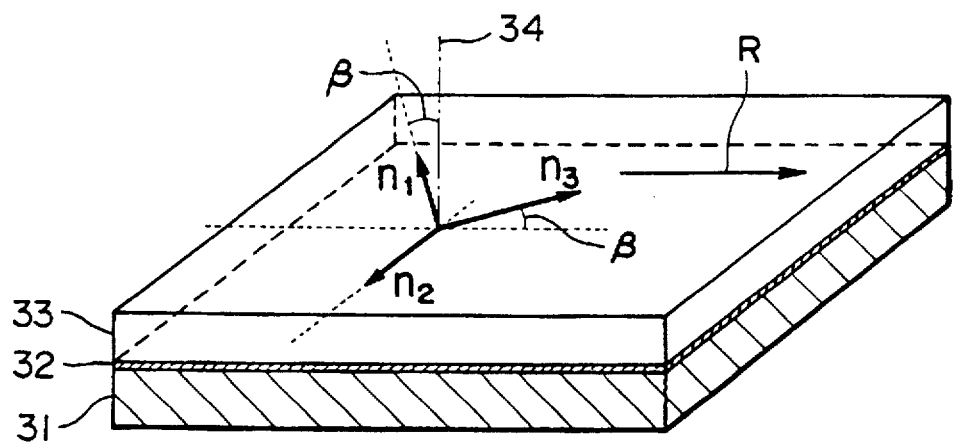
FIG. 3 is a view schematically showing the representative structure of the optically anisotropic layer of the invention.

The optically anisotropic layer comprising the discotic liquid crystalline compound generally has the minimum absolute retardation value in a direction inclined from the normal of the sheet and has no optic axis. The representative structure of the optically anisotropic layer of the invention is shown in FIG. 3. In FIG. 3, a transparent support 31, an orientation layer 32 and a layer of discotic liquid crystalline compound 33 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number $\beta$ is an inclined angle of the direction showing the minimum of Re from the normal 34 of the optical compensatory sheet.

The negative uniaxial property, that the optical compensatory sheet of the invention generally has, means property as satisfying the condition of:

$$n_1 < n_2 = n_3$$

in which $n_1$, $n_2$ and $n_3$ are refractive indices in the three axes directions of a optical compensatory sheet and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical uses, as long as the negative uniaxial property satisfies the condition of:

$$|n_2 - n_3|/|n_2 - n_1| \leq 0.2$$

in which $n_1$, $n_2$ and $n_3$ have the meanings described above.

In order to greatly improve the viewing angle characteristics of TN-LCD or TFT-LCD, the direction showing the minimum retardation value of the optical compensatory sheet is preferably inclined at 5 to 50 degrees from a normal line of the sheet ($\beta$ in FIG. 2) and especially 10 to 40 degrees.

Further, it is preferred that the sheet satisfies the condition of:

$$50 \leq [(n_3 + n_2)/2 - n_1] \times D \leq 400 \text{ (nm)}$$

in which D is a thickness of the sheet; and especially the condition of:

$$100 \leq [(n_3 + n_2)/2 - n_1] \times D \leq 400 \text{ (nm)}$$

Figure 4:
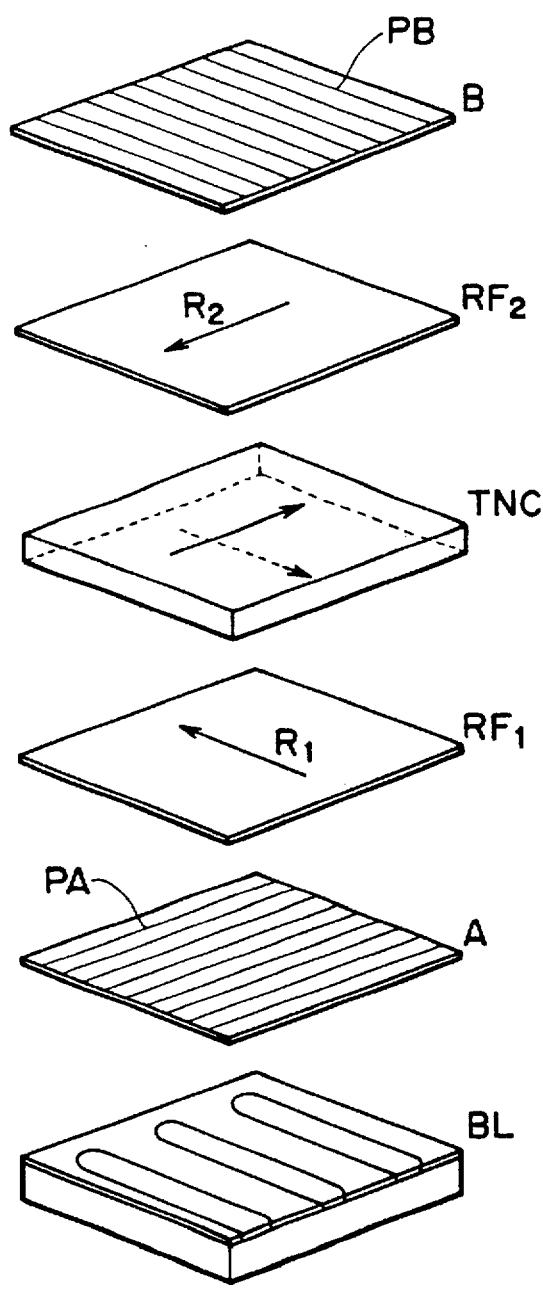
FIG. 4 is a view schematically showing the representative structure of a liquid crystal display having the optical compensatory sheet of the invention.

The representative structure of the liquid crystal display having the optical compensatory sheet of the invention is shown in FIG. 4. In FIG. 4, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets RF1 and RF2 between the liquid crystal cell and the polarizing sheet and back light BL are assembled to constitute the liquid crystal display. The optical compensatory sheet may be arranged only on one side (i.e., use of one of RF1 and RF2). The reference number R1 is a rubbing direction of the orientation layer of the optical compensatory sheet RF1, and the reference number R2 is the rubbing direction of the orientation layer of the optical compensatory sheet RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively. The orientation layer of the invention can be employed as that which is generally formed on the substrate.

Examples of the present invention and comparison examples are given below, but these examples by no means are construed to restrict the invention.

EXAMPLES 1 to 4 and COMPARISON EXAMPLE 1

Preparation of orientation layer

On a glass substrate, the following coating solution containing polyvinyl alcohol shown in Table 1 (described later) was coated with a bar coater, dried at 80° C. for 10 minutes to form a polymer layer of the polyvinyl alcohol having a thickness of 0.8 µm.

[Coating solution of polyvinyl alcohol]

| | |
|---|---|
| Polyvinyl alcohol shown in Table 1 | 1.0 weight part |
| Water | 18.0 weight parts |
| Methanol | 6.0 weight parts |

A surface of the resultant polymer layer was subjected to a rubbing treatment using a rubbing roller (outer diameter of 80 mm) in the conditions of rate of movement of the glass substrate of 100 m/min., the number of revolution of the rubbing roller of 1,000 rpm, and the tension for conveying the glass substrate of 1 kgf/cm (width of substrate), whereby an orientation layer was formed.

Formation of layer of discotic liquid crystalline compound

A methyl ethyl ketone solution (10 weight %) of discotic liquid crystalline compound (aforementioned compound TP-3) was coated using a spin coater (3,000 rpm) on the orientation layer provided on the glass substrate, and dried to form a layer of discotic liquid crystalline compound (optically anisotropic layer).

Evaluation of orientation property of optically anisotropic layer

The glass substrate having the orientation layer and the optically anisotropic layer was placed on a hot plate (PS82-Type Hot Stage, available from Metler Co., Ltd.), and the optically anisotropic layer was observed using a polarizing microscope (OPTIPHOT-POL, available from Nippon Kogaku K. K.) with heating the hot plate to evaluate the orientation conditions. Further, the discotic liquid crystalline compound layers of Examples 1 to 4 were observed using a polarizing microscope under crossed nicols. The discotic liquid crystalline compound layers showed high light transmission, and therefore it was confirmed that the layers had optically anisotropic property.

The results are set forth in Table 1.

TABLE 1

| Example | Polymer layer Polymer No. (mentioned before) | Orientation property |
|---|---|---|
| Ex. 1 | No. 1 | Uniform orientation |
| Ex. 2 | No. 35 | Uniform orientation |
| Ex. 3 | No. 39 | Uniform orientation |
| Ex. 4 | No. 53 | Uniform orientation |
| Com. Ex. 1 | *MP-203 | Local existence of schlieren texture |

Remark:
*available from Kuraray Co., Ltd.

EXAMPLES 5 to 34 and COMPARISON EXAMPLES 2 to 3

Preparation of orientation layer

On a triacetyl cellulose film having a thickness of 100 μm (available from Fuji Photo Film Co., Ltd.), the following coating solution containing polyvinyl alcohol shown in Table 2 (described later) was coated with a bar coater, dried at 80° C. for 10 minutes to form a polymer layer of the polyvinyl alcohol having a thickness of 0.8 μm.

[Coating solution of polyvinyl alcohol]

| Polyvinyl alcohol shown in Table 2 | 1.0 weight part |
|---|---|
| Water | 18.0 weight parts |
| Methanol | 6.0 weight parts |

A surface of the resultant polymer layer was subjected to rubbing treatment using a rubbing roller (outer diameter of 80 mm) under the conditions of rate of movement of the film of 100 m/min., the number of revolution of the rubbing roller of 1,000 rpm and tension for conveying the film of 1 kgf/cm (width of film), whereby an orientation layer was formed.

Formation of optically anisotropic layer

A coating solution of discotic liquid crystalline compound having the following composition was coated using a bar coater on the orientation layer provided on the TAC film to form a coated layer.

[Coating solution of discotic liquid crystalline compound]

| Cellulose acetate butyrate (CAB531, available from Eastman Chemical Co.) | 12 weight parts |
|---|---|
| Discotic liquid crystalline compound TP-3 (above-mentioned discotic compound No.) | 100 weight parts |
| Tripropyleneglycol diacrylate (SR306, available from Somal Co., Ltd.) | 10 weight parts |
| Photopolymerization initiator (Irgacure-907, available from Ciba-Geigy) | 2 weight parts |
| Methyl ethyl ketone | 400 weight parts |

The film having the coated layer was passed for 2 minutes through an area heated at a temperature of 140° C. to orient the discotic liquid crystalline compound of the coated layer, and then the coated layer was exposed to UV light for curing, whereby a thin layer (optically anisotropic layer; thickness: 2 μm) in which the oriented direction of the discotic liquid crystalline compound was fixed was formed to prepare an optical compensatory sheet.

Evaluation of orientation property of optically anisotropic layer and that after leaving the layer in the conditions of high temperature and moisture The film having the orientation layer and the optically anisotropic layer was placed on a hot plate (PS82-Type Hot Stage, available from Metler Co., Ltd.), and the optically anisotropic layer was observed using a polarizing microscope (OPTIPHOT-POL, available from Nippon Kogaku K. K.) with heating the hot plate to evaluate the orientation condition. Further, the film was allowed to stand for 20 hours under the conditions of a temperature of 75° C. and relative humidity of 95%, and then the orientation condition of the discotic liquid crystalline compound layer was evaluated in the same manner as above, whereby resistance to moisture-heat of the layer was evaluated. Further, the optically anisotropic layers of the Examples were observed using a polarizing microscope under crossed nicols. The optically anisotropic layers showed high light transmission, and therefore it was confirmed that the layers had optically anisotropic property.

Evaluation of orientation property was ranked as bellow:
AA: uniform orientation
BB: local existence of schlieren texture Evaluation of resistance to moisture-heat was ranked as bellow:
AA: uniform orientation
BB: occurrence of reticulation after standing for 20 hours under the above conditions
CC: occurrence of reticulation after standing for 5 hours under the above conditions The results are set forth in Table 2.

TABLE 2

| | Polymer layer | Orientation property | |
|---|---|---|---|
| Example | Polymer No. (above-mentioned) | Initial | Resistance to moist heat |
| Ex. 5 | No. 1 | AA | AA |
| Ex. 6 | No. 2 | AA | AA |
| Ex. 7 | No. 3 | AA | AA |
| Ex. 8 | No. 4 | AA | AA |
| Ex. 9 | No. 5 | AA | AA |
| Ex. 10 | No. 5/*MP-203 = 3/1 | AA | AA |
| Ex. 11 | No. 5/**PVA-117 = 4/1 | AA | AA |
| Ex. 12 | No. 10 | AA | AA |
| Ex. 13 | No. 14 | AA | AA |
| Ex. 14 | No. 20 | AA | AA |
| Ex. 15 | No. 25 | AA | AA |
| Ex. 16 | No. 26 | AA | AA |
| Ex. 17 | No. 29 | AA | AA |
| Ex. 18 | No. 35 | AA | AA |
| Ex. 19 | No. 36 | AA | AA |
| Ex. 20 | No. 37 | AA | AA |
| Ex. 21 | No. 38 | AA | AA |
| Ex. 22 | No. 39 | AA | AA |
| Ex. 23 | No. 39/*MP-2-3 = 3/1 | AA | AA |
| Ex. 24 | No. 39/**PVA-117 = 4/1 | AA | AA |
| Ex. 25 | No. 44 | AA | AA |
| Ex. 26 | No. 45 | AA | AA |
| Ex. 27 | No. 48 | AA | BB |
| Ex. 28 | No. 49 | AA | AA |
| Ex. 29 | No. 51 | AA | AA |
| Ex. 30 | No. 53 | AA | AA |
| Ex. 31 | No. 35/*MP-203 = 1/1 | AA | — |
| Ex. 32 | No. E | AA | — |
| Ex. 33 | No. E/*MP-203 = 1/3 | AA | — |
| Ex. 34 | No. E/**PVA-117 = 1/4 | AA | — |
| Com. Ex. 2 | *MP-203 | AA | CC |
| Com. Ex. 3 | **PVA-117 | AA | CC |

Remark:
*, **: available from Kuraray Co., Ltd.

EXAMPLES 35 to 46 and COMPARISON EXAMPLES 4 to 9

The procedures of Example 5 were repeated except for using a discotic liquid crystalline compound shown in Table 3 instead of TP-3 and polymer shown in Table 3 instead of polymer No. 1 to prepare an optical compensatory sheet.

As for the optical compensatory sheets obtained in Examples 35 to 46 and Comparison Examples 4 to 9, orientation property and resistance to moisture-heat were evaluated in the same manner as above (Example 5). Further, the optically anisotropic layers (discotic liquid crystalline compound layers) of Examples were observed under crossed-nicols. The optically anisotropic layers showed high light transmission. and therefore it was confirmed that the layers showed optically anisotropic property.

The results are set forth in Table 3.

TABLE 3

| Example | Polymer No. | Discotic compound No. | Orientation property Initial | Resistance to moisture-heat |
|---|---|---|---|---|
| Ex. 35 | No. 1 | TP-4 | AA | AA |
| Ex. 36 | No. 1 | TP-5 | AA | AA |
| Ex. 37 | No. 1 | TP-8 | AA | AA |
| Ex. 38 | No. 1 | TP-17 | AA | AA |
| Ex. 39 | No. 1 | TP-23 | AA | AA |
| Ex. 40 | No. 1 | TP-28 | AA | AA |
| Ex. 41 | No. 39 | TP-4 | AA | AA |
| Ex. 42 | No. 39 | TP-5 | AA | AA |
| Ex. 43 | No. 39 | TP-8 | AA | AA |
| Ex. 44 | No. 39 | TP-17 | AA | AA |
| Ex. 45 | No. 39 | TP-23 | AA | AA |
| Ex. 46 | No. 39 | TP-28 | AA | AA |
| Co. Ex. 4 | Polyimide | TP-4 | BB | CC |
| Co. Ex. 5 | Polyimide | TP-5 | BB | CC |
| Co. Ex. 6 | Polyimide | TP-8 | BB | CC |
| Co. Ex. 7 | *MP-203 | TP-17 | AA | CC |
| Co. Ex. 8 | *MP-203 | TP-23 | AA | CC |
| Co. Ex. 9 | *MP-203 | TP-28 | AA | CC |

Remark:
*available from Kuraray Co., Ltd.

EXAMPLES 47 to 52 and COMPARISON EXAMPLES 10 to 11

Preparation of orientation layer

On a triacetyl cellulose film having a thickness of 100 μm (available from Fuji Photo Film Co., Ltd.), a thin layer of gelatin (0.1 μm) was formed. The following coating solution containing polyvinyl alcohol shown in Table 4 (described later) was coated with a bar coater on the gelatin layer, dried to 90° C. to form a polymer layer of the polyvinyl alcohol having a thickness of 0.8 μm.

[Coating solution of polyvinyl alcohol]

| Polyvinyl alcohol shown in Table 4 | 1.0 weight part |
|---|---|
| Water | 18.0 weight parts |
| Methanol | 6.0 weight parts |

A surface of the resultant polymer layer was subjected to a rubbing treatment using a rubbing roller (outer diameter of 80 mm) under the conditions of rate of movement of the film of 100 m/min., the number of revolution of the rubbing roller of 1,000 rpm. and the tension for conveying the film of 1 kgf/cm (width of film), whereby an orientation layer was formed.

"$|nx-ny|\times d$" and "$\{(nx+ny)/2-nz\}\times d$" of the triacetyl cellulose film was determined, in which nx and ny is main refractictive indices within the film, nz is a main refractive index in thickness direction, and d is a thickness of the film (FIG. 1). The thickness was measured with a micrometer, and Re values in various directions were measured by an ellipsometer (AEP-100, available from Shimadzu Seisakusho, Ltd.) to determine the above "$|nx-ny|\times d$" and "$\{(nx+ny)/2-nz\}\times d$". "$|nx-ny|\times d$" was 6 nm and "$\{(nx+ny)/2-nz\}\times d$" was 40 nm. Thus, the film had almost negative uniaxial property and the optic axis almost was coincident with the direction of the normal of film.

Formation of optically anisotropic layer

A coating solution of discotic liquid crystalline compound having the following composition was coated using a bar coater (#3 bar) on the orientation layer provided on the TAC film to form a coated layer.

[Coating solution of discotic liquid crystalline compound]

| Cellulose acetate butyrate (CAB551-0.2, available from Eastman Chemical Co.) | 4 weight parts |
|---|---|
| Discotic liquid crystalline compound TP-3 (above-mentioned discotic compound No.) | 182 weight parts |
| Ethylene glycol modified-trimethylolpropane triacrylate (V#360, available from Osaka Organic Chemical Industry Co., Ltd.) | 18 weight parts |
| Photopolymerization initiator (Irgacure-907, available from Ciba-Geigy) | 6 weight parts |
| Sensitizer (Kayacure-DETX, available from Nippon Kayaku Co., Ltd.) | 2 weight parts |
| Methyl ethyl ketone | 343 weight parts |

The coated film was fixed in a metal frame. and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp (120 w/cm) for 1 min. and cooled to room temperature to form an optically anisotropic layer of 2 μm thick. Thus, an optical compensatory sheet was obtained. The optically anisotropic layer was observed using a polarizing microscope under crossed nicols. The layer showed high light transmission. Therefore, it was confirmed that the layer had optically anisotropic property.

As for the optical compensatory sheets obtained in Examples 47 to 52 and Comparison Examples 10 to 11, bonding strength between the optically anisotropic layer and the orientation layer was evaluated by cellophane tape peel test. In more detail, a thin plastic tape was stuck on the optically anisotropic layer, and the tape was peeled from the optically anisotropic layer by pulling the tape parallel to the layer. The bonding strength was evaluated whether the optically anisotropic layer was stuck on the tape, and was ranked as follows:

AA: no layer was stuck on the peeled tape CC: optically anisotropic layer was stuck on the peeled tape The results are set forth in Table 4.

TABLE 4

| Example | Polymer No. | Discotic compound No. | Bonding Strength |
|---|---|---|---|
| Ex. 47 | No. 1 | TP-3 | AA |
| Ex. 48 | No. 39 | TP-3 | AA |
| Ex. 49 | No. 53 | TP-3 | AA |
| Ex. 50 | No. 1/No. 39 = 1/1 | TP-3 | AA |
| Ex. 51 | No. 1/No. 53 = 1/1 | TP-3 | AA |
| Ex. 52 | No. 39/No. 53 = 1/1 | TP-3 | AA |
| Co. Ex. 10 | *MP-203 | TP-3 | CC |
| Co. Ex. 11 | **PVA-117 | TP-3 | CC |

Remark:
*, **: vilble from Kuraray Co., Ltd.

The optical compensatory sheets obtained in Examples 47 to 52 were prepared by coating the optically anisotropic layer comprising a discotic compound having a polymerizable group on the orientation layer comprising the polymer having a polymerizable group and curing these layers. These layers were strongly bonded each other. In contrast, the optical compensatory sheets obtained in comparison examples 10 and 11 were prepared by coating the optically anisotropic layer comprising a discotic compound having a polymerizable group on the orientation layer comprising the polymer having no polymerizable group and curing only the optically anisotropic layer. These layers were easily peeled off each other. Hence, it was confirmed that the two layers of the optical compensatory sheets of Examples 47 to 52 are chemically bonded each other.

What is claimed is:

1. An optical compensatory sheet which comprises a transparent support, an orientation layer provided thereon and an optically anisotropic layer provided on the orientation layer, the orientation layer comprising a polymer and the optically anisotropic layer comprising a liquid crystalline compound, wherein the polymer of the orientation layer is chemically bonded to the liquid crystalline compound of the optically anisotropic layer via the interface of these layers.

2. The optical compensatory sheet as defined in claim 1, wherein the polymer is formed of a polyvinyl alcohol at least one hydroxyl group of which is substituted with a group having a vinyl moiety, an oxiranyl moiety or an aziridinyl moiety.

3. The optical compensatory sheet as defined in claim 1, wherein the optically anisotropic layer is formed of a liquid crystalline compound which has a group having a vinyl moiety, an oxiranyl moiety or an aziridinyl moiety.

4. The optical compensatory sheet as defined in claim 1, wherein the liquid crystalline compound is a discotic liquid crystalline compound which has a group having a vinyl moiety, an oxiranyl moiety or an aziridinyl moiety.

5. An element which comprises a transparent support, an orientation layer provided thereon and an optically anisotropic layer provided on the orientation layer, the orientation layer comprising a polymer and the optically anisotropic layer comprising a liquid crystalline compound, wherein the polymer of the orientation layer is chemically bonded to the liquid crystalline compound of the optically anisotropic layer via the interface of these layers.

6. The element as defined in claim 5 wherein the polymer is formed of a polyvinyl-alcohol at least one hydroxyl group of which is substituted with a group having a vinyl moiety, an oxiranyl moiety or an aziridinyl moiety.

7. An optical compensatory sheet which comprises a transparent support, an orientation layer provided thereon and an optically anisotropic layer provided on the orientation layer, the orientation layer comprising a polymer and the optically anisotropic layer comprising a liquid crystalline compound, wherein the polymer of the orientation layer comprises polyvinyl alcohol at least one hydroxyl group of which is substituted with a group having the formula (II):

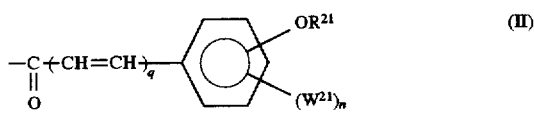

wherein $R^{21}$ represents an alkyl group, or an alkyl group which is substituted with alkyl, alkoxy, aryl, halogen, vinyl, vinyloxy, oxiranyl, acryloyloxy, methacryloyloxy, or crotonoyloxy;

$W^{21}$ represents an alkyl group, an alkyl group which is substituted with alkyl, alkoxy, aryl, halogen, vinyl, vinyloxy, oxiranyl, acryloyloxy, methacryloyloxy, or crotonoyloxy, an alkoxy group, an alkoxy group which is substituted with alkyl, alkoxy, aryl, halogen, vinyl, vinyloxy, oxiranyl, acryloyloxy, methacryloyloxy, or crotonoyloxy;

q is 0 or 1; and n is an integer of 0 to 4, wherein the polymer of the orientation layer is chemically bonded to the liquid crystalline compound of the optically anisotropic layer via the interface of these layers.

8. The optical compensatory sheet as defined in claim 7, wherein the optically anisotropic layer is formed of a discotic liquid crystalline compound.

9. The optical compensatory sheet as defined in claim 7, wherein the liquid crystalline compound is a discotic liquid crystalline compound which has a group having an aryl moiety.

10. An element which comprises a transparent support, an orientation layer provided thereon and an optically anisotropic layer provided on the orientation layer, the orientation layer comprising a polymer and the optically anisotropic layer comprising a liquid crystalline compound, wherein the polymer of the orientation layer comprises polyvinyl alcohol at least one hydroxyl group of which is substituted with a group having the formula (II):

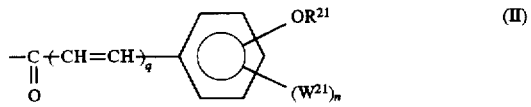

wherein $R^{21}$ represents an alkyl group, or an alkyl group which is substituted with alkyl, alkoxy, aryl, halogen, vinyl, vinyloxy, oxiranyl, acryloyloxy, methacryloyloxy, or crotonoyloxy;

$W^{2}1$ represents an alkyl group, an alkyl group which is substituted with alkyl, alkoxy, aryl, halogen, vinyl, vinyloxy, oxiranyl, acryloyloxy, methacryloyloxy, or crotonoyloxy, an alkoxy group, an alkoxy group which is substituted with alkyl, alkoxy, aryl, halogen, vinyl, vinyloxy, oxiranyl, acryloyloxy, methacryloyloxy, or crotonoyloxy;

q is 0 or 1; and n is an integer of 0 to 4, wherein the polymer of the orientation layer is chemically bonded to the liquid crystalline compound of the optically anisotropic layer via the interface of these layers.

* * * * *